United States Patent
Mullins et al.

(10) Patent No.: US 12,510,164 B1
(45) Date of Patent: Dec. 30, 2025

(54) SLEEVED FLUID END

(71) Applicant: Vulcan Industrial Holdings, LLC, Houston, TX (US)

(72) Inventors: Chance Ray Mullins, Spring, TX (US); Kyle Matthew Ellisor, Katy, TX (US); Jason David Smith, Porter, TX (US); Steven Zachary Newberg, Houston, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 965 days.

(21) Appl. No.: 17/405,117

(22) Filed: Aug. 18, 2021

(51) Int. Cl.
- *F16K 1/42* (2006.01)
- *F04B 53/10* (2006.01)
- *F16K 1/46* (2006.01)

(52) U.S. Cl.
CPC .......... *F16K 1/427* (2013.01); *F04B 53/1087* (2013.01); *F16K 1/465* (2013.01); *F16K 2200/102* (2021.08)

(58) Field of Classification Search
CPC ........... F16J 15/18; F16K 1/427; F16K 1/465; F16K 2200/102; F04B 53/1087
See application file for complete search history.

(56) References Cited

U.S. PATENT DOCUMENTS

| | | |
|---|---|---|
| 1,316,539 A | 9/1919 | Ford |
| 1,364,848 A | 1/1921 | Walsh |
| 1,576,269 A | 3/1926 | Durant |
| 1,595,459 A | 8/1926 | Durant |
| 1,671,139 A | 5/1928 | Wilson |
| 1,836,068 A | 12/1931 | Goldsberry |
| 1,873,318 A | 8/1932 | Eason |
| 1,914,737 A | 6/1933 | Elms |
| 1,948,628 A | 2/1934 | Penick |
| 1,963,684 A | 6/1934 | Shimer |
| 1,963,685 A | 6/1934 | Shimer |

(Continued)

FOREIGN PATENT DOCUMENTS

| | | |
|---|---|---|
| CN | 2556355 Y | 6/2003 |
| CN | 201149099 | 11/2008 |

(Continued)

OTHER PUBLICATIONS

Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.

(Continued)

*Primary Examiner* — Gilbert Y Lee
(74) *Attorney, Agent, or Firm* — Womble Bond Dickinson (US) LLP

(57) ABSTRACT

A fluid end includes a first sleeve associated with a plunger bore, a second sleeve assembly associated with a suction bore, and a packing sleeve retainer positioned at the plunger bore to axially retain a packing sleeve of the first sleeve assembly within the plunger bore, the packing sleeve retainer being coupled to a front face of the fluid end. The fluid end further includes a suction ring positioned at the suction bore to axially retain a suction sleeve of the second sleeve assembly within the suction bore, the suction ring being coupled to a rear face of the fluid end.

29 Claims, 22 Drawing Sheets

(56) References Cited

U.S. PATENT DOCUMENTS

| | | |
|---|---|---|
| 2,011,547 A | 8/1935 | Campbell |
| 2,069,443 A | 2/1937 | Hill |
| 2,103,504 A | 12/1937 | White |
| 2,143,399 A | 1/1939 | Abercrombie |
| 2,146,709 A | 2/1939 | Bird |
| 2,151,442 A | 3/1939 | Hardy |
| 2,163,472 A | 6/1939 | Shimer |
| 2,252,488 A | 8/1941 | Bierend |
| 2,304,991 A | 12/1942 | Foster |
| 2,506,128 A | 5/1950 | Ashton |
| 2,539,996 A | 1/1951 | Gleitz |
| 2,547,831 A | 4/1951 | Mueller |
| 2,713,522 A | 7/1955 | Lorenz |
| 2,719,737 A | 10/1955 | Fletcher |
| 2,745,631 A | 5/1956 | Shellman |
| 2,756,960 A | 7/1956 | Church |
| 2,898,082 A | 8/1959 | Von Almen |
| 2,969,951 A | 1/1961 | Walton |
| 2,977,874 A | 4/1961 | Ritzerfeld et al. |
| 2,982,515 A | 5/1961 | Clinton |
| 2,983,281 A | 5/1961 | Bynum |
| 3,049,082 A | 8/1962 | Barry |
| 3,053,500 A | 9/1962 | Atkinson |
| 3,063,467 A | 11/1962 | Roberts, Jr. |
| 3,120,960 A | 2/1964 | Pippert et al. |
| 3,166,332 A | 1/1965 | Olson |
| 3,224,817 A | 12/1965 | Carter |
| 3,276,390 A | 10/1966 | Bloudoff |
| 3,277,837 A | 10/1966 | Pangburn |
| 3,288,475 A | 11/1966 | Benoit |
| 3,459,363 A | 8/1969 | Miller |
| 3,474,808 A | 10/1969 | Elliott |
| 3,483,885 A | 12/1969 | Leathers |
| 3,489,098 A | 1/1970 | Roth |
| 3,489,170 A | 1/1970 | Leman |
| 3,512,787 A | 5/1970 | Kennedy |
| 3,590,387 A | 6/1971 | Landis |
| 3,640,501 A | 2/1972 | Walton |
| 3,652,098 A | 3/1972 | Kawazu et al. |
| 3,698,726 A | 10/1972 | Schettler |
| 3,738,665 A | 6/1973 | Bilco |
| 3,785,659 A | 1/1974 | Maurer et al. |
| 3,809,508 A | 5/1974 | Uchiyama |
| 3,847,511 A | 11/1974 | Cole |
| 3,907,307 A | 9/1975 | Maurer |
| 3,931,755 A | 1/1976 | Hatridge |
| 4,044,834 A | 8/1977 | Perkins |
| 4,076,212 A | 2/1978 | Leman |
| 4,184,814 A | 1/1980 | Parker |
| 4,219,204 A | 8/1980 | Pippert |
| 4,277,229 A | 7/1981 | Pacht |
| 4,306,728 A | 12/1981 | Huperz |
| 4,331,741 A | 5/1982 | Wilson |
| 4,395,050 A | 7/1983 | Wirz |
| 4,398,731 A | 8/1983 | Gorman |
| 4,440,404 A | 4/1984 | Roach |
| 4,500,267 A | 2/1985 | Birdwell |
| 4,508,133 A | 4/1985 | Hamid |
| 4,518,359 A | 5/1985 | Yao-Psong |
| 4,527,806 A | 7/1985 | Ungchusri |
| 4,565,297 A | 1/1986 | Korner |
| 4,580,791 A | 4/1986 | DiRusso |
| 4,662,392 A | 5/1987 | Vadasz |
| 4,754,950 A | 7/1988 | Tada |
| 4,763,876 A | 8/1988 | Oda |
| 4,768,933 A | 9/1988 | Stachowiak |
| 4,770,206 A | 9/1988 | Sjoberg |
| 4,807,890 A | 2/1989 | Gorman |
| 4,811,758 A | 3/1989 | Piper |
| 4,822,058 A | 4/1989 | Butler et al. |
| 4,861,241 A | 8/1989 | Gamboa |
| 4,872,395 A | 10/1989 | Bennitt et al. |
| 4,878,815 A | 11/1989 | Stachowiak |
| 4,919,719 A | 4/1990 | Abe |
| 4,951,707 A | 8/1990 | Johnson |
| 5,020,490 A | 6/1991 | Seko |
| 5,052,435 A | 10/1991 | Crudup |
| 5,061,159 A | 10/1991 | Pryor |
| 5,062,450 A | 11/1991 | Bailey |
| 5,073,096 A | 12/1991 | King et al. |
| 5,080,713 A | 1/1992 | Ishibashi |
| 5,088,521 A | 2/1992 | Johnson |
| 5,127,807 A | 7/1992 | Eslinger |
| 5,131,666 A | 7/1992 | Hutchens |
| 5,135,238 A | 8/1992 | Wells |
| 5,149,107 A | 9/1992 | Maringer |
| 5,201,491 A | 4/1993 | Domangue |
| 5,209,495 A | 5/1993 | Palmour |
| 5,249,600 A | 10/1993 | Blume |
| 5,267,736 A | 12/1993 | Pietsch |
| 5,273,570 A | 12/1993 | Sato |
| 5,299,812 A | 4/1994 | Brestel |
| 5,314,659 A | 5/1994 | Hidaka |
| 5,362,215 A | 11/1994 | King |
| 5,382,057 A | 1/1995 | Richter |
| 5,478,048 A | 12/1995 | Salesky |
| 5,493,951 A | 2/1996 | Harrison |
| 5,533,245 A | 7/1996 | Stanton |
| 5,540,570 A | 7/1996 | Schuller |
| 5,572,920 A | 11/1996 | Kennedy |
| 5,593,166 A | 1/1997 | Lovell et al. |
| 5,626,345 A | 5/1997 | Wallace |
| 5,636,688 A | 6/1997 | Bassinger |
| 5,674,449 A | 10/1997 | Liang |
| 5,806,858 A | 9/1998 | Harrelson, III |
| 5,834,664 A | 11/1998 | Aonuma |
| 5,859,376 A | 1/1999 | Ishibashi |
| 5,895,517 A | 4/1999 | Kawamura |
| 5,924,853 A | 7/1999 | Pacht |
| 5,949,003 A | 9/1999 | Aoki |
| 6,139,599 A | 10/2000 | Takahashi |
| 6,200,688 B1 | 3/2001 | Liang |
| 6,209,445 B1 | 4/2001 | Roberts, Jr. |
| 6,328,312 B1 | 12/2001 | Schmitz |
| 6,340,377 B1 | 1/2002 | Kawata |
| 6,382,940 B1 | 5/2002 | Blume |
| 6,386,548 B1 | 5/2002 | Grimanis et al. |
| 6,436,338 B1 | 8/2002 | Qiao |
| 6,446,939 B1 | 9/2002 | Hoppe |
| 6,460,620 B1 | 10/2002 | LaFleur |
| 6,464,749 B1 | 10/2002 | Kawase |
| 6,482,275 B1 | 11/2002 | Qiao |
| 6,485,678 B1 | 11/2002 | Liang |
| 6,544,012 B1 | 4/2003 | Blume |
| 6,571,684 B1 | 6/2003 | Nov et al. |
| 6,623,259 B1 | 9/2003 | Blume |
| 6,634,236 B2 | 10/2003 | Mars |
| 6,641,112 B2 | 11/2003 | Antoff |
| 6,695,007 B2 | 2/2004 | Vicars |
| 6,702,905 B1 | 3/2004 | Qiao |
| 6,880,802 B2 | 4/2005 | Hara |
| 6,910,871 B1 | 6/2005 | Blume |
| 6,916,444 B1 | 7/2005 | Liang |
| 6,951,165 B2 | 10/2005 | Kuhn |
| 6,951,579 B2 | 10/2005 | Koyama |
| 6,955,181 B1 | 10/2005 | Blume |
| 6,959,916 B2 | 11/2005 | Chigasaki |
| 7,000,632 B2 | 2/2006 | McIntire |
| 7,036,824 B2 | 5/2006 | Kunz |
| 7,144,440 B2 | 12/2006 | Ando |
| 7,168,440 B1 | 1/2007 | Blume |
| 7,186,097 B2 | 3/2007 | Blume |
| 7,222,837 B1 | 5/2007 | Blume |
| 7,290,560 B2 | 11/2007 | Orr |
| 7,296,591 B2 | 11/2007 | Moe |
| 7,335,002 B2 | 2/2008 | Vicars |
| 7,341,435 B2 | 3/2008 | Vicars |
| 7,398,955 B2 | 7/2008 | Weingarten |
| 7,506,574 B2 | 3/2009 | Jensen |
| 7,513,483 B1 | 4/2009 | Blume |
| 7,513,759 B1 | 4/2009 | Blume |
| 7,562,675 B2 | 7/2009 | Nomichi et al. |
| 7,611,590 B2 | 11/2009 | Liang |
| 7,681,589 B2 | 3/2010 | Schwegman |

(56) References Cited

U.S. PATENT DOCUMENTS

| | | |
|---|---|---|
| 7,682,471 B2 | 3/2010 | Levin |
| 7,726,026 B1 | 6/2010 | Blume |
| 7,748,310 B2 | 7/2010 | Kennedy |
| 7,754,142 B2 | 7/2010 | Liang |
| 7,754,143 B2 | 7/2010 | Qiao |
| 7,757,396 B2 | 7/2010 | Sawada |
| 7,789,133 B2 | 9/2010 | McGuire |
| 7,789,161 B2 | 9/2010 | Riley |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,931,078 B2 | 4/2011 | Toporowski et al. |
| 7,954,510 B2 | 6/2011 | Schwegman |
| 7,992,635 B2 | 8/2011 | Cherewyk |
| 8,020,638 B2 | 9/2011 | Chellappa et al. |
| 8,069,923 B2 | 12/2011 | Blanco |
| 8,075,000 B2 | 12/2011 | James et al. |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,201,832 B2 | 6/2012 | Kocurek |
| 8,261,771 B2 | 9/2012 | Witkowski |
| 8,287,256 B2 | 10/2012 | Shafer |
| 8,291,927 B2 | 10/2012 | Johnson |
| 8,292,301 B1 | 10/2012 | Gilstad et al. |
| 8,312,805 B1 | 11/2012 | Blume |
| 8,317,498 B2 | 11/2012 | Gambier |
| 8,328,202 B2 | 12/2012 | Foster et al. |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,814,139 B2 | 8/2014 | Griffin et al. |
| 8,814,432 B2 | 8/2014 | Thoma et al. |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,955,850 B2 | 2/2015 | Saucerman et al. |
| 8,978,695 B2 | 3/2015 | Witkowkski |
| 8,998,593 B2 | 4/2015 | Vicars |
| 9,010,412 B2 | 4/2015 | McGuire |
| 9,016,693 B1 | 4/2015 | Shek et al. |
| 9,067,346 B2 | 6/2015 | Kohn et al. |
| 9,103,448 B2 | 8/2015 | Nitkowski |
| 9,121,503 B2 | 9/2015 | Dietle et al. |
| 9,150,945 B2 | 10/2015 | Bei |
| 9,157,136 B2 | 10/2015 | Chou |
| 9,157,468 B2 | 10/2015 | Dille |
| 9,188,242 B2 | 11/2015 | Giove et al. |
| 9,206,910 B2 | 12/2015 | Kahn |
| D748,228 S | 1/2016 | Bayyouk |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,341,039 B2 | 5/2016 | Galle et al. |
| 9,359,921 B2 | 6/2016 | Hashimoto |
| 9,360,115 B2 | 6/2016 | Chaplin et al. |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschorner |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,791,082 B2 | 10/2017 | Baxter et al. |
| 9,822,894 B2 | 11/2017 | Bayyouk |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,957,770 B2 | 5/2018 | Averill et al. |
| 9,989,044 B2 | 6/2018 | Bayyouk |
| 10,029,540 B2 | 7/2018 | Seeger |
| D826,281 S | 8/2018 | Mead |
| 10,041,490 B2 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Barnhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,260,634 B2 | 4/2019 | Lenhert et al. |
| 10,273,954 B2 | 4/2019 | Brown |
| 10,288,178 B2 | 5/2019 | Nowell |
| 10,309,182 B2 | 6/2019 | Jones et al. |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |

(56) References Cited

U.S. PATENT DOCUMENTS

| | | |
|---|---|---|
| 10,378,535 B2 | 8/2019 | Mahmood |
| 10,378,538 B2 | 8/2019 | Blume |
| 10,378,659 B2 | 8/2019 | Scott et al. |
| 10,393,113 B2 | 8/2019 | Wagner |
| 10,400,764 B2 | 9/2019 | Wagner |
| 10,415,348 B2 | 9/2019 | Zhang |
| 10,415,719 B2 | 9/2019 | Leboeuf et al. |
| D861,834 S | 10/2019 | Foster et al. |
| D864,691 S | 10/2019 | Campos |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| D871,455 S | 12/2019 | Crowsley |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| D880,661 S | 4/2020 | Foster et al. |
| D881,958 S | 4/2020 | Han |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 * | 6/2020 | Foster .................... F04B 1/122 |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,567 B2 | 7/2020 | Buckley |
| 10,711,754 B2 | 7/2020 | Nelson |
| 10,711,778 B2 | 7/2020 | Buckley |
| 10,718,441 B2 | 7/2020 | Myers |
| D893,684 S | 8/2020 | Matthys |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| D895,777 S | 9/2020 | Chase |
| 10,767,520 B1 | 9/2020 | Hattiangadi |
| 10,771,567 B2 | 9/2020 | Sundaresan |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,808,851 B1 | 10/2020 | Surjaatmadja et al. |
| 10,815,988 B2 | 10/2020 | Buckley |
| 10,815,989 B2 | 10/2020 | Naedler et al. |
| 10,830,360 B2 | 11/2020 | Frank |
| 10,837,556 B2 | 11/2020 | Chase et al. |
| 10,851,775 B2 | 12/2020 | Stark |
| 10,865,325 B2 | 12/2020 | Nakao |
| 10,895,325 B2 | 1/2021 | Nowell et al. |
| D910,820 S | 2/2021 | Grassl |
| 10,907,738 B2 | 2/2021 | Nowell |
| 10,914,171 B2 | 2/2021 | Foster |
| 10,914,383 B2 | 2/2021 | Kustermans et al. |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D915,197 S | 4/2021 | Katano |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yar |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,149,856 B2 | 10/2021 | Mattoni et al. |
| 11,156,221 B2 | 10/2021 | Stark et al. |
| 11,162,859 B2 | 11/2021 | Lei |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| D949,202 S | 4/2022 | Sharpstone |
| 11,300,111 B2 | 4/2022 | Thomas et al. |
| 11,333,249 B2 | 5/2022 | Jones et al. |
| 11,353,117 B1 | 6/2022 | Smith |
| 11,359,615 B2 | 6/2022 | Thomas et al. |
| 11,384,756 B1 | 7/2022 | Smith |
| 11,391,374 B1 * | 7/2022 | Ellisor ................ F04B 53/164 |
| 11,421,679 B1 | 8/2022 | Mullins |
| 11,421,680 B1 | 8/2022 | Smith |
| 11,434,714 B2 | 9/2022 | Machocki |
| 11,434,900 B1 | 9/2022 | Alex |
| 11,441,683 B2 | 9/2022 | Mullins et al. |
| 11,454,321 B2 | 9/2022 | Mullins et al. |
| 11,473,686 B2 | 10/2022 | Bayyouk |
| 11,566,713 B2 | 1/2023 | Poremski |
| D980,876 S | 3/2023 | Smith |
| 11,608,896 B2 | 3/2023 | Al-Darra |
| D986,928 S | 5/2023 | Smith et al. |
| 11,692,544 B2 | 7/2023 | Chase |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,846,356 B1 | 12/2023 | Ellisor |
| 11,891,988 B2 | 2/2024 | Mullins et al. |
| 11,920,684 B1 | 3/2024 | Xu et al. |
| D1,022,145 S | 4/2024 | Meyers |
| D1,031,952 S | 6/2024 | Huntley |
| D1,036,632 S | 7/2024 | Suzuki |
| 12,038,086 B2 | 7/2024 | Shuck |
| 12,049,889 B2 | 7/2024 | Ellisor et al. |
| D1,039,657 S | 8/2024 | Cox |
| 12,055,221 B2 | 8/2024 | Ellisor et al. |
| 12,140,240 B2 | 11/2024 | Xu |
| D1,061,623 S | 2/2025 | Newberg et al. |
| D1,063,005 S | 2/2025 | Lorkowski |
| 12,247,557 B2 | 3/2025 | Avey et al. |
| 12,247,561 B2 | 3/2025 | Avey et al. |
| 12,270,394 B2 | 4/2025 | Ellisor et al. |
| 12,292,120 B1 | 5/2025 | Mullins et al. |
| 12,292,121 B2 | 5/2025 | Berryhill |

(56) References Cited

U.S. PATENT DOCUMENTS

| | | |
|---|---|---|
| 12,297,922 B1 | 5/2025 | Xu |
| 12,345,253 B2 | 7/2025 | Mullins et al. |
| 12,345,332 B2 | 7/2025 | Ellisor |
| 12,366,244 B2 | 7/2025 | Alex et al. |
| 12,366,245 B1 | 7/2025 | Ellisor et al. |
| 12,404,931 B2 | 9/2025 | Ellisor et al. |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0098963 A1 | 5/2005 | Olsen |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0042369 A1 | 2/2008 | Krywitsky et al. |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0166980 A1 | 7/2009 | Miller et al. |
| 2009/0261575 A1 | 10/2009 | Bull |
| 2009/0278069 A1 | 11/2009 | Blanco |
| 2010/0143163 A1 | 6/2010 | Patel et al. |
| 2010/0230628 A1 | 9/2010 | Stefina |
| 2010/0272597 A1 | 10/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2011/0266752 A1 | 11/2011 | Kocurek |
| 2011/0296982 A1 | 12/2011 | Dille et al. |
| 2012/0141308 A1 | 6/2012 | Saini |
| 2012/0157786 A1 | 6/2012 | Pribanic |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0263932 A1 | 10/2013 | Baxter et al. |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0319780 A1 | 10/2014 | Vertenten |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0051738 A1 | 2/2017 | Horning |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0102101 A1 | 4/2017 | Duval-Arnould |
| 2017/0122055 A1 | 5/2017 | Embury |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0218951 A1 | 8/2017 | Graham |
| 2017/0218993 A1 | 8/2017 | Freed |
| 2017/0268674 A1 | 9/2017 | Barbera et al. |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 * | 1/2019 | Foster ............... F04B 1/145 |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0040966 A1 | 2/2019 | Myers et al. |
| 2019/0047049 A1 | 2/2019 | Fujieda |
| 2019/0049052 A1 | 2/2019 | Shuck |
| 2019/0063427 A1 | 2/2019 | Nowell |
| 2019/0063430 A1 | 2/2019 | Byrne |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0368614 A1 | 12/2019 | Hurst |
| 2019/0376508 A1 | 12/2019 | Wagner |
| 2020/0023245 A1 | 1/2020 | Story et al. |
| 2020/0056272 A1 | 2/2020 | Hong |
| 2020/0063899 A1 | 2/2020 | Witkowkski |
| 2020/0070034 A1 | 3/2020 | Sukup et al. |

(56) References Cited

U.S. PATENT DOCUMENTS

| | | |
|---|---|---|
| 2020/0072369 A1 | 3/2020 | Singley et al. |
| 2020/0080660 A1 | 3/2020 | Dyer |
| 2020/0080661 A1 | 3/2020 | Mullins |
| 2020/0132195 A1 | 4/2020 | Coombs |
| 2020/0157663 A1 | 5/2020 | Yang |
| 2020/0158123 A1 | 5/2020 | Chen |
| 2020/0173317 A1 | 6/2020 | Keating |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1* | 9/2020 | Nowell ................ F16B 35/005 |
| 2020/0300367 A1 | 9/2020 | Caglio et al. |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0362975 A1 | 11/2020 | Hurst et al. |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0025497 A1 | 1/2021 | Tsuji |
| 2021/0040836 A1 | 2/2021 | Baskin |
| 2021/0054486 A1 | 2/2021 | Kim |
| 2021/0062944 A1 | 3/2021 | Lee |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0222690 A1 | 7/2021 | Beisel |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0163031 A1 | 5/2022 | Chase |
| 2022/0163032 A1 | 5/2022 | Chase |
| 2022/0163118 A1 | 5/2022 | Maffezzoli et al. |
| 2022/0243723 A1 | 8/2022 | Herold et al. |
| 2022/0282719 A1 | 9/2022 | Barnhouse |
| 2022/0320790 A1 | 10/2022 | Demaratos |
| 2022/0349472 A1* | 11/2022 | Ellisor .................... F16J 15/18 |
| 2022/0390055 A1 | 12/2022 | Ellisor |
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 4/2023 | Belshan et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0332596 A1 | 10/2023 | Chase |
| 2023/0383743 A1 | 11/2023 | Brock et al. |
| 2023/0383859 A1 | 11/2023 | Wiegand et al. |
| 2023/0407864 A1 | 12/2023 | Alex et al. |
| 2024/0042627 A1 | 2/2024 | Wang et al. |
| 2024/0102460 A1 | 3/2024 | Kachovskiy et al. |
| 2024/0117882 A1 | 4/2024 | Ellisor |
| 2024/0200656 A1 | 6/2024 | Avey |
| 2024/0200666 A1 | 6/2024 | Leake |
| 2024/0209945 A1 | 6/2024 | Prate et al. |
| 2024/0262067 A1 | 8/2024 | Iversen et al. |
| 2024/0309724 A1 | 9/2024 | Miller et al. |
| 2024/0369139 A1 | 11/2024 | Ellisor |
| 2024/0376892 A1 | 11/2024 | Ellisor |
| 2024/0376984 A1 | 11/2024 | Ellisor |
| 2024/0384795 A1 | 11/2024 | Barnett et al. |
| 2024/0418164 A1 | 12/2024 | Peer |
| 2025/0027486 A1 | 1/2025 | Alex et al. |
| 2025/0052325 A1 | 2/2025 | Berryhill |
| 2025/0075818 A1 | 3/2025 | Xu |
| 2025/0237308 A1 | 7/2025 | Ellisor |
| 2025/0251044 A1 | 8/2025 | Berryhill |
| 2025/0277487 A1 | 9/2025 | Ellisor et al. |
| 2025/0283463 A1 | 9/2025 | Mullins et al. |
| 2025/0283464 A1 | 9/2025 | Ellisor et al. |
| 2025/0305586 A1 | 10/2025 | Mullins et al. |

FOREIGN PATENT DOCUMENTS

| | | |
|---|---|---|
| CN | 102748483 | 10/2012 |
| CN | 202545162 U | 11/2012 |
| CN | 203257342 U | 10/2013 |
| CN | 204040978 U | 12/2014 |
| CN | 104329464 A | 2/2015 |
| CN | 204738957 U | 11/2015 |
| CN | 205315253 U | 6/2016 |
| CN | 109458326 A | 3/2019 |
| CN | 209261799 U | 8/2019 |
| CN | 110374522 A | 10/2019 |
| CN | 209469613 U | 10/2019 |
| CN | 111005695 A | 4/2020 |
| CN | 111073186 A | 4/2020 |
| CN | 102410194 | 4/2021 |
| DE | 3126421 | 1/1983 |
| DE | 102009001560 A1 | 9/2010 |
| DE | 202012104058 U1 | 3/2014 |
| EP | 0 414 955 | 3/1991 |
| EP | 0520567 A1 | 12/1992 |
| EP | 3336356 A1 | 6/2018 |
| EP | 3696408 A1 | 8/2020 |
| GB | 2123100 | 1/1986 |
| GB | 2240592 | 8/1991 |
| JP | 2021025560 A | 2/2021 |
| WO | 2016/024939 | 2/2016 |
| WO | 2021195572 | 9/2021 |
| WO | 2022167341 A1 | 8/2022 |
| WO | 2024026432 | 2/2024 |
| WO | 2024076786 A1 | 4/2024 |

OTHER PUBLICATIONS

Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.

White Star Pump Co., "Maintenance Manual: Triplex Pump WS-1300/1600," 2005, http://www.whitestarpump.com/ES/docs/user_t.pdf, 45 pages.

(56) References Cited

OTHER PUBLICATIONS

KerrPumps, "Super Stainless Steel Better Than the Best," http://kerrpumps.com/superstainless?gclid=EAlalQobChMlg470482q6wlVilTICh2XPA-qEAAYASAAEgKrxPD_BwE, 2013, last accessed: Aug. 21, 2020, 6 bages.

KerrPumps, "Frac One Pumps—Fluid End—Fracing," http://kerrpumps.com/fracone, 2013, last accessed: Aug. 21, 2020, 3 pages.

KerrPumps, "KerrPumps—Frac Pump & Mud Pump Fluid End—Fluid End Pump," http://kerrpumps.com/fluidends, 2013, last accessed: Aug. 21, 2020, 6 pages.

Vulcan Industrial, "Vulcan," http://www.vulcanindustrial.com/, 2019, last accessed: Aug. 21, 2020, 3 pages.

Vulcan Industrial, "Vulcan," http://www.vulcanindustrial.com/fluid-ends/, 2019, last accessed: Aug. 21, 2020, 3 pages.

COVERT Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).

Kerr Pumps, "the most advanced fluid ends", (site visited Aug. 5, 2021), Kerrpumps.com, URL: <http://kerrpumps.com/fluidends> (Year: 2021).

Shandong Baorun, 2250 Triplex Plunger Pump Fluid End Exchangeable with Spm, (site visited Aug. 5, 2021), made-in-china.com, URL: < https://sdbaorun.en.made-in-china.com/product/wNixIDXYrshL/China-2250-Triplex-Plunger-Pump-Fluid-End-Exchangeable-with-Spm.html> (Year: 2021).

John Miller, "The Reciprocating Pump, Theory, Design and Use," 1995, 2nd Edition, Krieger Publishing Company, Malabar, Florida, 1 page.

"QIH-1000 HP Quintuplex," Dixie Iron Works, 2017, https://web.archive.org/web/20171031221150/http:/www.diwmsi.com/pumping/qi-1000/.

Technical Manual MSI Hybrid Well Service Pump Triplex and Quintuplex Models, Dixie Iron Works, Mar. 12, 2019, 88 pages. https://www.diwmsi.com/pumping/qi-1000/.

Carpenter, "CarTech Ferrium C61 Data Sheet," 2015, 2 pages.

The American Heritage Dictionary, Second College Edition, 1982, 6 pages.

Matthew Bultman, "Judge in West Texas Patent Hot Spot Issues Revised Guidelines," Sep. 23, 2020, Bloomberg Law News, 3 pages.

David L. Taylor, "Machine Trades Blueprint Reading: Second Edition," 2005, 3 pages.

Blume, U.S. Pat. No. 6,544,012, issued Apr. 8, 2003, Fig. 12A.

Caterpillar, "Cat Fluid Ends for Well Stimulation Pumps," 2015, 2 pages.

Claim Chart for U.S. Pat. No. 6,544,012, 23 pages.
Claim Chart for U.S. Pat. No. 7,186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.

Collins English Dictionary, "annular," https://www.collinsdictionary.com/us/dictionary/english/annular, 2021, 4 pages.

Collins English Dictionary, "circumference," https://www.collinsdictionary.com/US/dictionary/english/circumference, 2021, 7 pages.

Collins English Dictionary, "plug," https://www.collinsdictionary.com/us/dictionary/english/plug, 2021, 17 pages.

Collins English Dictionary, "profile," https://www.collinsdictionary.com/us/dictionary/english/profile, 2021, 10 pages.

Collins English Dictionary, "sleeve," "therethrough," "through," "tube," and "tubular," 8 pages.

Collins English Dictionary, "space," https://www.collinsdictionary.com/us/dictionary/english/space, 2021, 13 pages.

Collins English Dictionary, "stairstep," https://www.collinsdictionary.com/us/dictionary/english/stairstep, 2021, 3 pages.

Congressional Record—Extensions of Remarks, Apr. 18, 2007, pp. E773-E775.

Congressional Record, Mar. 7, 2011, 31 pages.

"Declaration of Steven M. Tipton, Ph.D., P.E., Submitted with Patent Owner's Preliminary Response," Sep. 11, 2020, 155 pages.

"Declaration of William D. Marscher, P.E.—U.S. Pat. No. 10,914,171," Feb. 11, 2021, 308 pages.

"Declaration of William D. Marscher, P.E.—U.S. Pat. No. 10,591,070," May 25, 2020, 209 pages.

Email dated Sep. 22, 2020 in PGR2020-00065, 3 pages.

Email dated Sep. 25, 2020 in Kerr Machine v Vulcan Industrial Holdings, 1 page.

U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.

Karolczuk et al., "Application of the Gaussian Process for Fatigue Life Prediction Under Multiaxial Loading", Mechanical Systems and Signal Processing 167 (2022), Nov. 14, 2021.

Carraro et al. "A Damage Based Model for Crack Initiation in Unidirectional Composites Under Multiaxial Cyclic Loading", Composite Science and Technology 99 (2014), 154-163, May 16, 2014.

Albinmousa et al., "Cyclic Axial and Cyclic Torsional Behaviour of Extruded AZ31B Magnesium Alloy", International Journal of Fatigue 33 (2011), 1403-1416, 2011.

Horstemeyer et al., "Universal Material Constants for Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.

Guan et al., "Model Selection, Updating, and Averaging for Probabilistic Fatigue Damage Prognosis", Journal of Structural Safety, Mar. 11, 2011.

Frick et al., "Orientation-Independent Pseudoelasticity in Small-Scale Niti Compression Pillars", Scripta Materialia 59(12), 7-10, 2008.

Naghipour et al., "Fatigue Analysis of Notched Laminates: a Time-Efficient Macro-Mechanical Approach", Ohio Aerospace Institute, Cleveland, 2016.

U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.

"Flush Free Sealing Benefits," Oct. 3, 2011, http://empoweringpumps.com/flush-free-sealing-benefits/, accessed May 9, 2020, 5 pages.

Gardner Denver, Well Servicing Pump Model GD-3000—Operating and Service Manual, Apr. 2011, 44 pages.

Gardner Denver, Well Servicing Pump Model GD-1000Q—Fluid End Parts List, Sep. 2011, 24 pages.

Gardner Denver, Well Servicing Pump Model HD-2250—Operating and Service Manual, Jan. 2005, 44 pages.

Gardner Denver, GD 2500Q HDF Frac & Well Service Pump, 2 pages.

Cutting Tool Engineering, "Groove milling," Aug. 1, 2012, https://www.ctemag.cojm/news/articles/groove-milling, accessed May 13, 2020, 11 pages.

VargusUSA, "Groovex Innovative Grooving Solutions—Groove Milling, " Dec. 12, 2011, http://www.youtube.com/watch?v=vrFxHJUXjvk, 68 pages.

Kerr Pumps, Kerr KA-3500B/KA-3500BCB Plunger Pump Parts and Service Manual, 41 pages.

Kerr Pumps, Kerr KD-1250B/KD-1250BCB Plunger Pump Service Manual, 38 pages.

Kerr Pumps, Kerr KJ-2250B and KJ-2250BCB Plunger Pump Service Manual, 38 pages.

Kerr Pumps, Kerr KM-3250B / KM-3250BCB Plunger Pump Service Manual, 35 pages.

(56) References Cited

OTHER PUBLICATIONS

Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
International Search Report and Written Opinion for international application No. PCT/US2023/073458, mailed Feb. 1, 2024.
International Search Report and Written Opinion for international application No. PCT/US2023/066143, mailed Aug. 28, 2023.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
Weir SPM Oil & Gas, Grooveless Fluid End, 2008, 1 page.
Weir SPM Oil & Gas, Weir SPM General Catalog, 2009, 40 pages.
Weir SPM Oil & Gas, Well Service Pump Reference Guide, 2008, 55 pages.
*Intellectual Ventures I LLC* v *VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al.* v. *Kerr Machine Co.* Case No. 4:21-cv-433, Document 1, Complaint for Declaratory Judgment of Patent Non-Infringement, Feb. 9, 2021, 17 pages.
*Trilogy Enterprises, Inc.*, v. *Trilogy Education Services, LLC*, Case. No. 6:19-cv-199-ADA-JCM, Document 35, Fifth Amended Scheduling Order, Sep. 8, 2020, 4 pages.
*Dr. Corneliu Bolbocean* v *Baylor University*, Case No. 6:19-CV-00465-ADA-JCM, Document 34, Scheduling Order, Apr. 6, 2020, 4 pages.
*Kerr Machine Co.*, v *Vulcan Energy Services, LLC, Vulcan Industrial Holdings, LLC, and Cizion, LLC* d/b/a/ Vulcan Industrial Manufacturing, Case No. 6:21-CV-00044-ADA, Document 4, Plaintiff's Amended Complaint for Patent Infringement and Jury Demand, Jan. 19, 2021, 30 pages.
*Kerr Machine Co.*, v *Vulcan Energy Services, LLC, Vulcan Industrial Holdings, LLC, and Cizion, LLC* d/b/a/ Vulcan Industrial Manufacturing, Case No. 6:21-CV-00044, Document 1, Plaintiff's Original Complaint for Patent Infringement and Jury Demand, Jan. 19, 2021, 47 pages.
*Kerr Machine Co.*, v *Vulcan Energy Services, LLC, Vulcan Industrial Holdings, LLC, and Cizion, LLC* d/b/a/ Vulcan Industrial Manufacturing, Case No. 6:21-CV-00044-ADA, Document 10, Plaintiff's Second Amended Complaint for Patent Infringement and Jury Demand, Feb. 1, 2021, 88 pages.
*Kerr Machine Co.*, v *Vulcan Industrial Holdings, LLC, Vulcan Energy Services, LLC, Cizion, LLC*, Case No. W-20- CV-00200-ADA-24, Order Setting Trial Date, Jun. 14, 2020, 1 page.
*Kerr Machine Co.*, v *Vulcan Industrial Holdings, LLC, Vulcan Energy Services, LLC, Cizion, LLC*, Case No. W-20- CV-00200-ADA-29, Order Setting Trial Date, Aug. 2, 2020, 1 page.
*Kerr Machine Co.*, v. *Vulcan Industrial Holdings, LLC*, Case. No. 6:20-CV-00200-ADA, Affidavit of Service, Apr. 7, 2020, 1 page.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Plaintiff's First Amended Complaint for Patent Infringement and Jury Demand, Jun. 4, 2020, 11 pages.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.*, v *Vulcan Industrial Holdings, LLC*, Case No. 6:20-CV-00200-ADA, Plaintiff's Preliminary Infringement Contentions, May 22, 2020, 50 pages.

(56) References Cited

OTHER PUBLICATIONS

*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Defendants' Preliminary Invalidity Contentions, Aug. 13, 2020, 29 pages.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 34, Scheduling Order, Aug. 11, 2020, 3 pages.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 38, Plaintiff's Second Amended Complaint for Patent Infringement and Jury Demand, Sep. 25, 2020, 11 pages.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 5, Standing Order regarding Scheduled Hearings In Civil Cases in Light of Chief Judge Garcia's 24 Amended Order, Mar. 24, 2020, 4 pages.
*Kerr Machine Co.*, v *Vulcan Industrial Holdings, LLC, Vulcan Energy Services, LLC, and Cizion, LLC* d/b/a/ Vulcan Industrial Manufacturing, Civil Docket for Case No. 6:20-cv-00200-ADA, accessed Sep. 11, 2020, 7 pages.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Document 54, Claim Construction Order, Dec. 3, 2020, 3 pages.
*Kerr Machine Co.*, v *Vulcan Industrial Holdings, LLC, Vulcan Energy Services, LLC, and Cizion, LLC* d/b/a/ Vulcan Industrial Manufacturing, Case No. 6:20-CV-00200-ADA, Docket Entry, Aug. 2, 2020, 1 page.
*Kerr Machine Co.*, v *Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et al.*, v *Kuiper Dairy, LLC, et al.*, Case No. 6:20-CV-00250-ADA-JCM, Document 20, Scheduling Order, Jul. 22, 2020, 4 pages.
*Acquanlan Deonshay Harris* v. *Cenlar, FSB*, Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken*, Individually and as *Next Friend of A.M.B.*, v *Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.*, Case No. 6:20-CV-00356-ADA-JCM, Document 12, Scheduling Order, Jul. 28, 2020, 4 pages.
*Tipton International, Inc.*, v. *Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc.*, v. *Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.*, v. *3Shape Trios A/S and 3Shape A/S*, Case No. WA:19-CV-00680-ADA, Document 27, Scheduling Order, Apr. 8, 2020, 4 pages.
*Kerr Machine Co.* vs. *Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Vulcan, High-Impact Replacement Parts, Fortified Valves and Seats, found at: https://www.vulcanindustrial.com/energy-products/replacement-parts.
DiaCom Corporation, "Diaphragm Design Guidebook", 28 pages, 2018.

\* cited by examiner

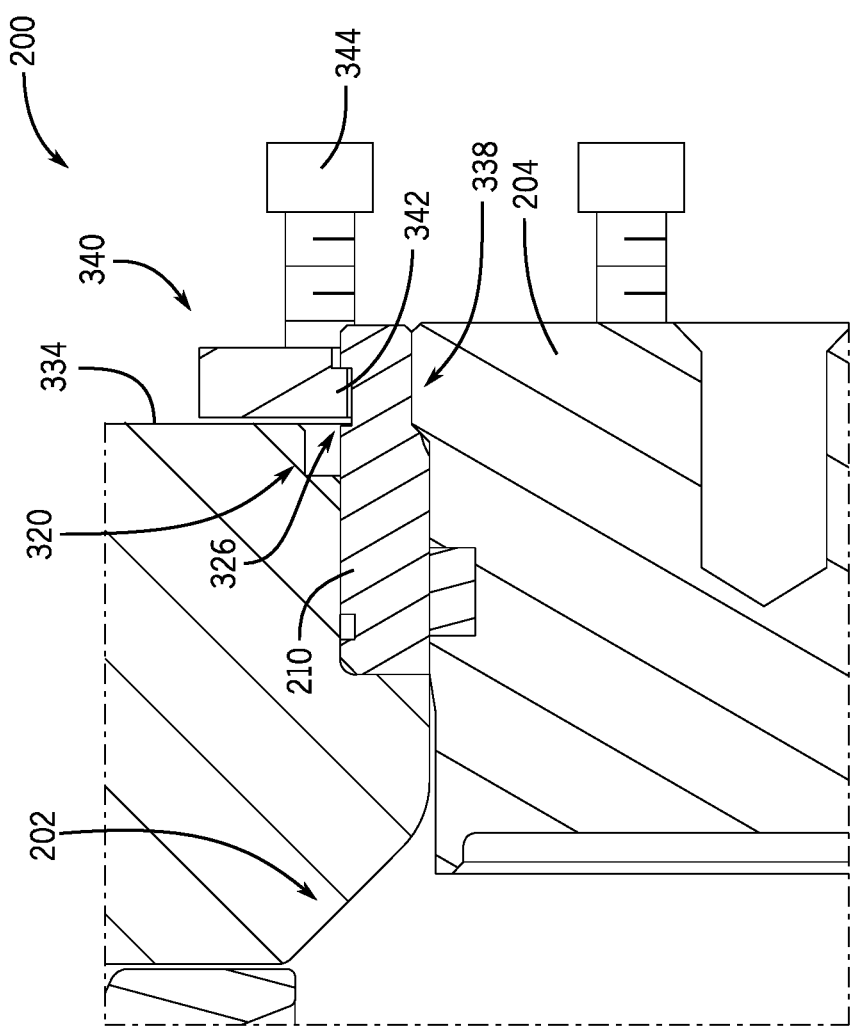

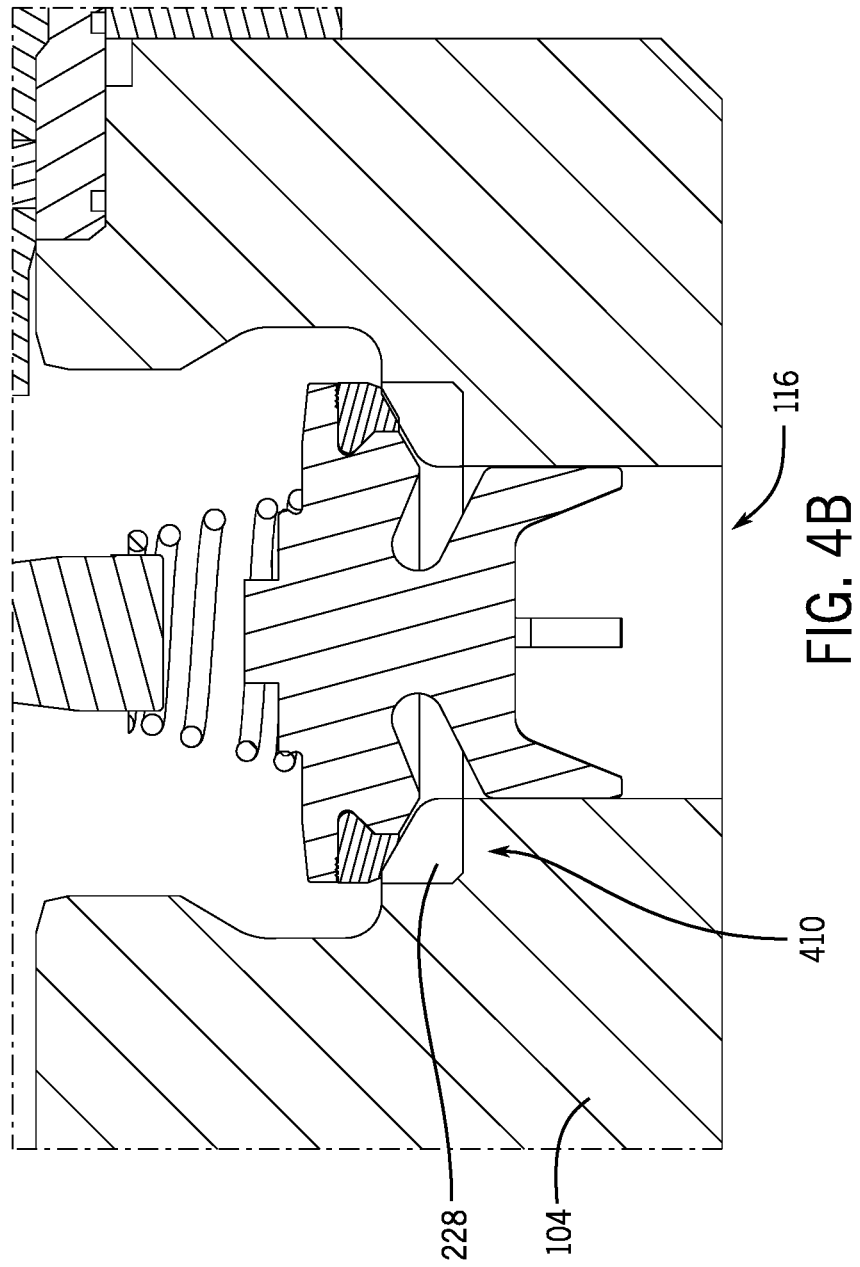

SLEEVED FLUID END

TECHNICAL FIELD

Embodiments of the subject matter disclosed herein generally relate to pump systems, and in particular to pump systems including one or more sleeves or sleeve assemblies.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A plunger reciprocates within a bore to add energy to the fluid. Due to the particulates and corrosive nature of the working fluid, sealing surfaces become eroded or otherwise damaged.

SUMMARY

Applicant recognized the problems noted above herein and conceived and developed embodiments of systems and methods, according to the present disclosure, for sleeve assemblies, and in various embodiments, fluid ends containing one or more sleeve assemblies at different sealing interfaces.

In accordance with one or more embodiments, a fluid end includes a plurality of sleeve assemblies associated with different respective bores extending through at least a portion of the fluid end, a first sleeve assembly of the plurality of sleeve assemblies associated with a plunger bore, a second sleeve assembly of the plurality of sleeve assemblies associated with a suction bore, and a third sleeve assembly of the plurality of sleeve assemblies associated with an inlet bore. The fluid end also includes a packing sleeve retainer positioned at the plunger bore to axially retain a packing sleeve of the first sleeve assembly within the plunger bore, the packing sleeve retainer being coupled to a front face of the fluid end. The fluid end further includes a suction ring positioned at the suction bore to axially retain a suction sleeve of the second sleeve assembly within the suction bore, the suction ring being coupled to a rear face of the fluid end.

In accordance with another embodiment, a pump assembly includes a fluid end block having a first bore and a second bore. The pump assembly also includes a plunger arranged to reciprocate within the first bore, a suction cover positioned within the second bore, and a packing sleeve assembly. The packing sleeve assembly includes a packing sleeve arranged within at least a portion of the first bore, the packing sleeve positioned radially outward from the plunger. The packing sleeve assembly also includes a packing sleeve retainer arranged within at least a portion of the first bore, the packing sleeve retainer axially restricting movement of the packing sleeve. The packing sleeve assembly further includes packing components positioned radially between the packing sleeve and the plunger, the packing components positioned being axially independent of the packing sleeve. The packing sleeve assembly further includes a packing retainer associated with the packing sleeve retainer and blocking axial movement of the packing components. The pump assembly further includes a suction sleeve assembly. The suction sleeve assembly includes a suction sleeve arranged within at least a portion of the second bore, at least a portion of the suction sleeve positioned radially outward from the suction cover. The suction sleeve assembly further includes a suction ring positioned external to the second bore and in axial contact with the suction sleeve to block axial movement of the suction sleeve. The suction sleeve assembly also includes a suction cover retainer coupled to the suction ring and positioned to block axial movement of the suction cover.

In accordance with another embodiment, a method includes providing a fluid end block. The method further includes installing, within a first bore of the fluid end block, a first sleeve, the first sleeve being retained within the first bore via a first retaining member coupled to a front face of the fluid end block. The method also includes installing, within a second bore of the fluid end block, a second sleeve, the second sleeve being retained within the second bore via a second retaining member coupled to a rear face of the fluid end block. The method further includes installing, within at least one of an inlet passage of outlet passage, a third sleeve.

In accordance with an embodiment, a fluid end includes a first sleeve associated with a plunger bore, a second sleeve assembly associated with a suction bore, and a packing sleeve retainer positioned at the plunger bore to axially retain a packing sleeve of the first sleeve assembly within the plunger bore, the packing sleeve retainer being coupled to a front face of the fluid end. The fluid end further includes a suction ring positioned at the suction bore to axially retain a suction sleeve of the second sleeve assembly within the suction bore, the suction ring being coupled to a rear face of the fluid end.

In accordance with an embodiment, a pump assembly includes a fluid end block having a first bore, a second bore, a third bore, and a fourth bore, the first bore extending from an external surface to an internal chamber, and the second bore extending from an opposite external surface to the internal chamber, the third and fourth bore extending independently toward the internal chamber, the internal chamber connecting each of the first bore, the second bore, the third bore, and the fourth bore. The pump assembly also includes a plunger arranged to reciprocate within the first bore, a suction cover positioned within the second bore, and a packing sleeve assembly. The packing sleeve assembly includes a packing sleeve arranged within at least a portion of the first bore, the packing sleeve positioned radially outward from the plunger. The packing sleeve assembly also includes a packing sleeve retainer arranged within at least a portion of the first bore, the packing sleeve retainer axially restricting movement of the packing sleeve. The packing sleeve assembly further includes packing components positioned radially between the packing sleeve and the plunger, the packing components positioned being axially independent of the packing sleeve. The packing sleeve assembly also includes a packing retainer associated with the packing sleeve retainer and blocking axial movement of the packing components.

In accordance with an embodiment, a pump assembly includes a fluid end block having a first bore, a second bore, a third bore, and a fourth bore, the first bore extending from an external surface to an internal chamber, and the second bore extending from an opposite external surface to the internal chamber, the third and fourth bore extending independently toward the internal chamber, the internal chamber connecting each of the first bore, the second bore, the third bore, and the fourth bore. The pump assembly also includes a plunger arranged to reciprocate within the first bore, a suction cover positioned within the second bore, and a suction seal assembly. The suction seal assembly includes a suction sleeve arranged within at least a portion of the second bore, at least a portion of the suction sleeve positioned radially outward from the suction cover. The suction seal assembly further includes a suction ring positioned external to the second bore and in axial contact with the suction sleeve to block axial movement of the suction sleeve. The suction seal assembly also includes a suction cover retainer coupled to the suction ring and positioned to block axial movement of the suction cover.

BRIEF DESCRIPTION OF THE DRAWINGS

The present technology will be better understood on reading the following detailed description of non-limiting embodiments thereof, and on examining the accompanying drawings, in which:

FIG. 3C is a detailed schematic cross-sectional view of an embodiment of a suction sleeve assembly removal tool, in accordance with embodiments of the present disclosure;

FIGS. 4A and 4B are detailed schematic cross-sectional views of embodiments of a valve sleeve assembly, in accordance with embodiments of the present disclosure;

DETAILED DESCRIPTION

Figure 1:
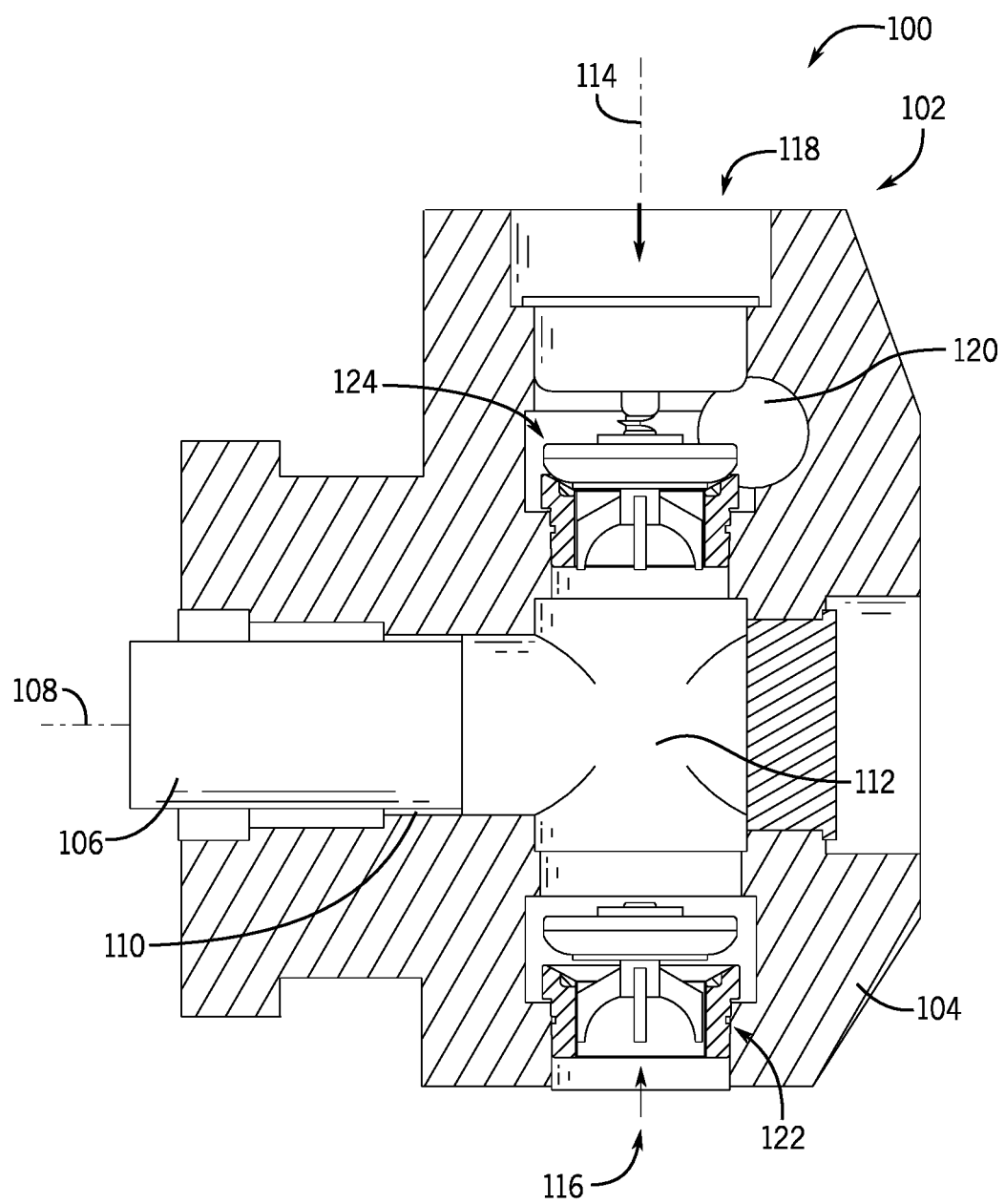
FIG. 1 is a schematic cross-sectional view of an embodiment of a pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, like reference numerals may be used for like components, but such use is for convenience purposes and not intended to limit the scope of the present disclosure. Moreover, use of terms such as substantially or approximately may refer to +/−10 percent.

Embodiments of the present disclosure are directed to fluid ends that include one or more sleeves at interfaces subject to abrasion-based failures and/or at threaded interfaces. In other words, embodiments may be directed toward interfaces that are related to sealing surfaces or sealing interface. That is, various embodiments of the present disclosure are directed toward one or more systems or methods to address failure modes of fluid ends by utilizing replaceable, sacrificial components. In one or more embodiments, the replaceable components are high hardness components. Various embodiments are directed toward positioning sleeves or sleeve assemblies at various sealing locations (e.g., sealing surfaces, sealing interfaces, etc.) that may be subject to abrasion or other potential failure modes, such as corrosive damage. Furthermore, embodiments may further address threaded interface failures while also addressing abrasion-based failures using a common sleeve or common solution.

Various embodiments are directed toward one or more sacrificial components to absorb the wear and/or damage associated with high pressure fluid ends, such as fluid ends that are utilized with solids-laden fluids, such as fracturing operations, among various others. The sacrificial components used with present embodiments may be replaced during one or more service or maintenance operations. In one or more embodiments, the sacrificial components are formed from a high hardness material. Various embodiments improve a useful life of a fluid end body by focusing failures or wear on replaceable components. In various embodiments, it may be less costly to replace these replaceable, sacrificial components than to replace or repair fluid end bodies. As such, operating costs may be reduced by employing embodiments of the present disclosure. In certain embodiments, these sacrificial components may further be utilized as a sleeve between a primary sealing element and a fluid end body. The sacrificial components may be arranged at various different locations around the fluid end body, such as locations having one or more bores associated with reciprocating or moving components, and moreover, locations associated with fluid flow.

Embodiments of the present disclosure further overcome various weaknesses and problems identified with traditional systems. By way of example, traditional fluid ends may incorporate one or more threaded components to secure elements within a flow port. One such example is a suction cover that threads directly into a body of a fluid end. Such a configuration may lead to the above-referenced problems associated with failures at threaded connections. Embodiments of the present disclosure address these and other deficiencies by, in at least one embodiment, mechanically retaining one or more sleeves via a connection to the front of the fluid face extending into the sleeves, rather than using a cap or other component coupled to the fluid end to secure or otherwise axially restrict a sleeve. As a result, the sleeve is mechanically retained and statically independent of the threaded component in the assembly (e.g., the suction cover in the above-referenced configuration). Moreover, systems and methods provide the advantage of enabling removal of the threaded component, such as the cover, without deenergizing the sleeve. That is, because the threaded component is no longer retaining or securing the sleeve, the cover may be separately removed and/or maintained without disturbing the sleeve. Accordingly, after wear has been sustained on the sleeve and it needs to be removed and/or repaired, it may be done by unbolting a front access cover and mechanically pulling the sleeve from the body and then using the retaining flange to drive a replacement sleeve into the fluid end body thereby preventing the need to remove the fluid end from service to freeze/torch components.

Furthermore, embodiments of the present disclosure may address one or more errors or deficiencies with historical designs that incorporate two removable valve seats. While these design may enable removal of valves seats upon detection of wear, monitoring and removal of the seats may be costly and time consuming to repair. Embodiments of the present disclosure may remove the traditional seats and replace them with a trapezoidal cross sectioned design that is permanently installed in the fluid end and designed to last the life of the fluid end. That is, while being removable, one or more design conditions may be aligned with those of the fluid end to reduce a likelihood of replacement of the valve seats. With the expectation of the life of the fluid end, the cross section no longer requires the lower half of the machining which sits upon a machine taper. Instead the guidance feature for the valve becomes integral to the fluid end body.

It should be appreciated that further benefits and improvements may be provided by systems and methods of the present disclosure. By way of example, one or more packing sleeves may be utilized to replace traditional designs such that the sleeve is designed with an inside diameter that is a continuous bore and the sleeve does not support the packing seals in an axial fashion. For example, one or more rings or supports may be installed within the bore of the sleeve to provide axial support for the packing seals. Moreover, as noted above with respect to one or more other sleeve assemblies, various embodiments enable securing the packing sleeve via one or more components coupled to a front face of the fluid end, as opposed to be associated with components that are mechanically coupled within the bore.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid end 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet passage 118, which are generally coaxial and arranged along the pressure chamber axis 114. In other words, the inlet passage 116 and the outlet chamber 118 are axially aligned with respect to one another and/or the pressure chamber 112. In various embodiments, fluid enters the pressure chamber 112 via the inlet passage 116, for example on an up stroke of the plunger rod 106, and is driven out of the pressure chamber 112 to an outlet passage 120, for example on a down stroke of the plunger 106.

Respective valve assemblies 122, 124 are arranged within the inlet passage 116 and the outlet chamber 118. These valve assemblies 122, 124 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 122, thereby driving fluid into the pressure chamber 112. However, on the down stroke, the valve assembly 122 may be driven to a closed position, while the spring force of the valve assembly 124 is overcome, thereby enabling the fluid to exit via the outlet passage 120.

In one or more embodiments, various sealing or support elements may be arranged in any one of the various passages. By way of example, one or more sleeves or seats may be positioned within passages, which may include one or more seals, to block fluid flow out of the fluid end. As noted above, certain traditional systems may utilize replaceable components that may be secured using one or more couplings that thread into the fluid end and/or one or more features that are positioned within the passages. Various embodiments of the present disclosure may be utilized to overcome the problems associated with traditional systems by providing one or more sacrificial sleeve components within at least one passage of the fluid end, and in certain embodiments, within each passage of the fluid end. Furthermore, systems and methods may be directed toward securing, removing, and reinstalling various components. In an example, a sleeve may be secured to the fluid end using one or more fasteners that are separate from and not associated with additional components coupled to the fluid end, thereby preventing deenergizing the sleeve upon removal of other components. In another example, one or more components may be particularly selected and designed to operate for a life of the fluid end, and as a result, may be configured with different cross-sectional dimensions due to a reduced likelihood of removal or replacement. As will be described herein, systems and methods may be incorporated in various fluid end designs that may include one or more of the systems, in combination or separate from one another. Furthermore, illustration of one of the configurations does not preclude a fluid end that does not include one or more of the configurations but that does include others.

Figure 2:
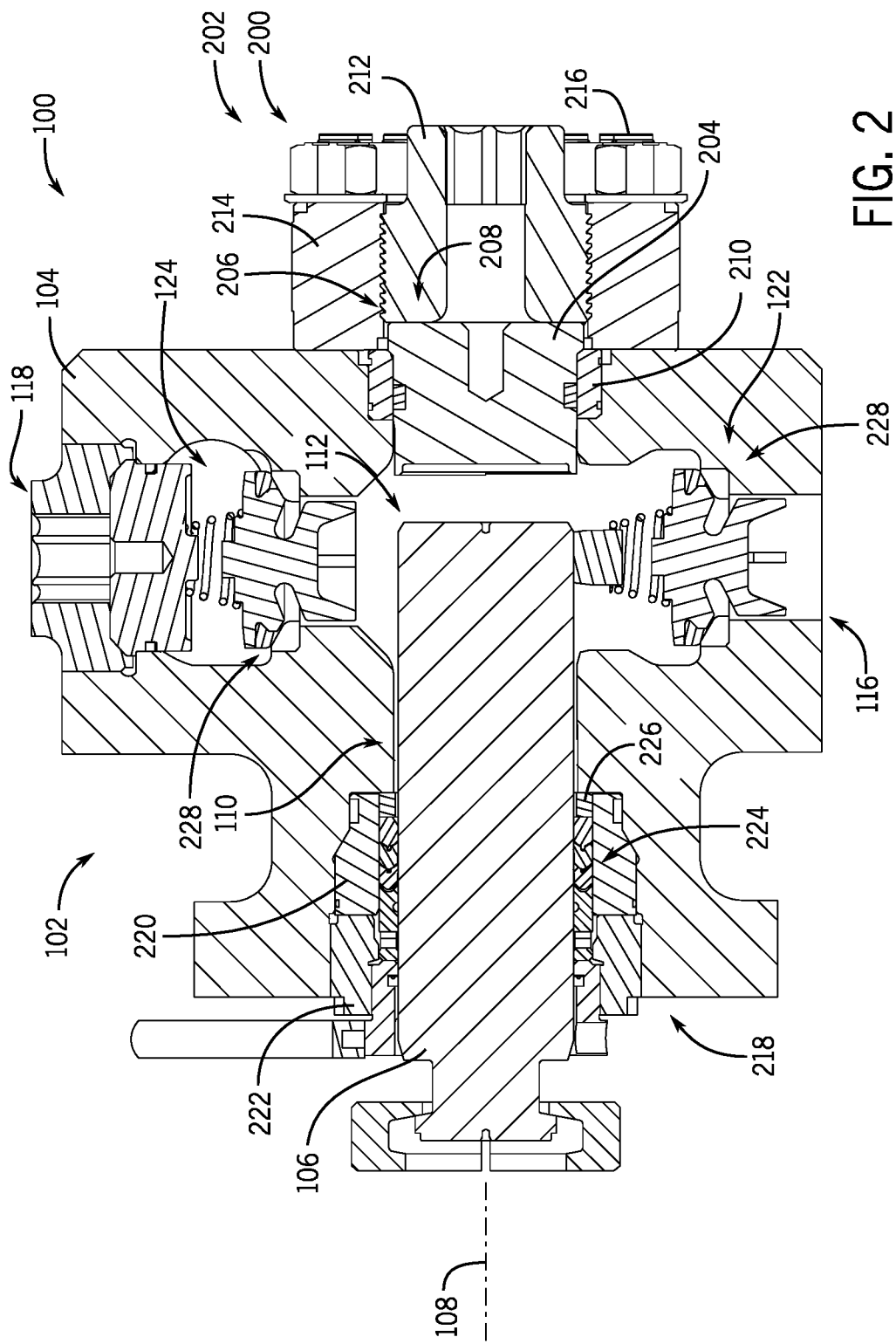
FIG. 2 is a schematic cross-sectional view of an embodiment to a sleeved pump assembly, in accordance with embodiments of the present disclosure.

FIG. 2 is a cross-sectional view of an embodiment of the pump assembly 100. It should be appreciated that like reference numerals may be used for certain like components and that such use is for convenience purposes and is not intended to limit the scope of the present disclosure. Various embodiments of the present disclosure may further be described with reference to one or more assemblies or systems that may include one or more groups of components, in combination with one another. However, it should be appreciated that an assembly or system may include a singular component or a portion of a group of components. Furthermore, as noted above, various embodiments may remove or add one or more components, which may not be pictured, such as various fasteners, seals, lubricants, and the like.

Embodiments of the present disclosure illustrate the fluid end 102 including the plunger 106 extending through the bore 110. In operation, the plunger 106 reciprocates along the axis 108 to pressurize fluid within the chamber 112. This reciprocating action may lead to opening and closing of the inlet and outlet valve assemblies 122, 124. In operation, movement of these components may lead to wear at various surface, for example due to the abrasive nature of the fluid, which may include particulates, corrosives, and the like. Typical wear areas may include interfaces between movable components, at seal interfaces, at threaded interfaces, and at contact points between moving components. Systems and methods may be directed toward one or more sleeve assemblies that may be utilized as sacrificial components to receive damage and then be replaced during one or more maintenance operations. In various embodiments, sleeve assemblies may be formed from components that have different metallurgical or mechanical properties than other components of the fluid end 102, such as a reduced hardness, increased hardness, less susceptibility to corrosion, or more susceptibility to corrosion. That is, the sleeve assemblies may be particularly selected to accommodate a variety of replacement options or replacement intervals, where different metallurgical properties may lead to more frequent replacement than other metallurgical properties. Such a configuration may provide for a cheaper component where replacements are less costly than repair or replacement of the fluid end block 104.

In the illustrated embodiment, a suction end 200 (e.g., end, suction side, etc.) includes a suction assembly 202 having a suction cover 204 extending into a suction bore 206. In one or more embodiments, the suction cover 204 may be a thread component that is threaded directly to the fluid end 102, such as to the block 104. However, embodiments of the present disclosure illustrate a suction sleeve assembly 208 including a suction sleeve 210 positioned between at least a portion of the suction cover 204 and the block 104. In this configuration, the suction sleeve 210 is positioned within the bore 206 and, in various embodiments, is retained within the bore 206 due to one or more cover retainers 212. The illustrated embodiment further includes a suction ring 214, which may be coupled directly to the block 104 via one or more ring fasteners 216. In this example, the cover retainer 212 is arranged within the suction ring 214 and is coupled to one or more threaded components of the suction ring 214. As will be described below, one or more embodiments of the present disclosure may include one or more ring shoulders to bear against the suction sleeve 210 to separately secure the suction sleeve 210 from the suction cover 204. That is, the suction cover 204 may be removed from the suction sleeve assembly 208 without disturbing or otherwise removing the suction sleeve 210.

Further illustrated in FIG. 2 is a packing sleeve assembly 218 associated with the bore 110 and the plunger 106. In this example, the packing sleeve assembly 218 includes a packing sleeve 220 positioned within the bore 110. The packing sleeve 220 is secured within the bore via one or more packing sleeve retainers 222, which may include preloading mechanisms, as will be described below. In this example, the packing sleeve 220 is arranged radially outward from the plunger 106 and is not in contact with the plunger 106. That is, packing components 224 are positioned between the packing sleeve 220 and the plunger 106. In at least one embodiment, the packing components 224 are not axially supported by the packing sleeve 220 and one or more rings 226 may be positioned within the bore 110 to axially support the packing components 224.

Further illustrated in FIG. 2 are sets of valve sleeves 228, which in this example are positioned associated with the inlet and outlet valve assemblies 122, 124. The illustrated valve sleeves 228 are arranged along the inlet and outlet passages 116, 118 and may be positioned such that one or more components of the assemblies 122, 124 engage the valve sleeves 228 during operation, such as a valve member that includes a strike face that is driven against the valve sleeves 228. As noted herein, the valve sleeves 228 and/or valve member may be exposed to high pressure along with solids-containing and/or corrosive fluids, and as a result, abrasive wear may, over time, cause leakage at the assemblies 122, 124, as well as at various other sealing locations. As will be described, embodiments of the present disclosure may incorporate one or more sleeves 210, 220, 228 to protect various components from wear caused by working fluid associated with the fluid end 102.

The illustrated embodiment includes an improved fluid end 102 incorporating various sleeves and sleeve assemblies to overcome problems with existing configurations due to abrasion-wear, among other failure mechanisms, which may occur at different locations along the valve, such as where components are moving, or where threaded couplings, among others, are present. As will be described, embodiments of the present disclosure may provide sacrificial components with improved replacement methods to facilitate removal and installation upon detection of wear or damage. Furthermore, embodiments may be directed toward components made of materials that will wear out or otherwise experience damage prior to components of the fluid end 102, such as the block 104, thereby improving a useful life of the block 104. Additionally, embodiments may be directed toward components made out of high hardness materials selected to withstand operation within environments associated with the working fluid to protect other components of the fluid end 102. As will be described herein, various embodiments may include different configurations, which may include one or more additional components, as well as removal of components. It should be appreciated that the fluid end 102 is illustrated as including each of the sleeves and/or assemblies, but other embodiments may omit one or more of the illustrated sleeves and/or assemblies while remaining within the scope of the present disclosure.

Figure 3A:
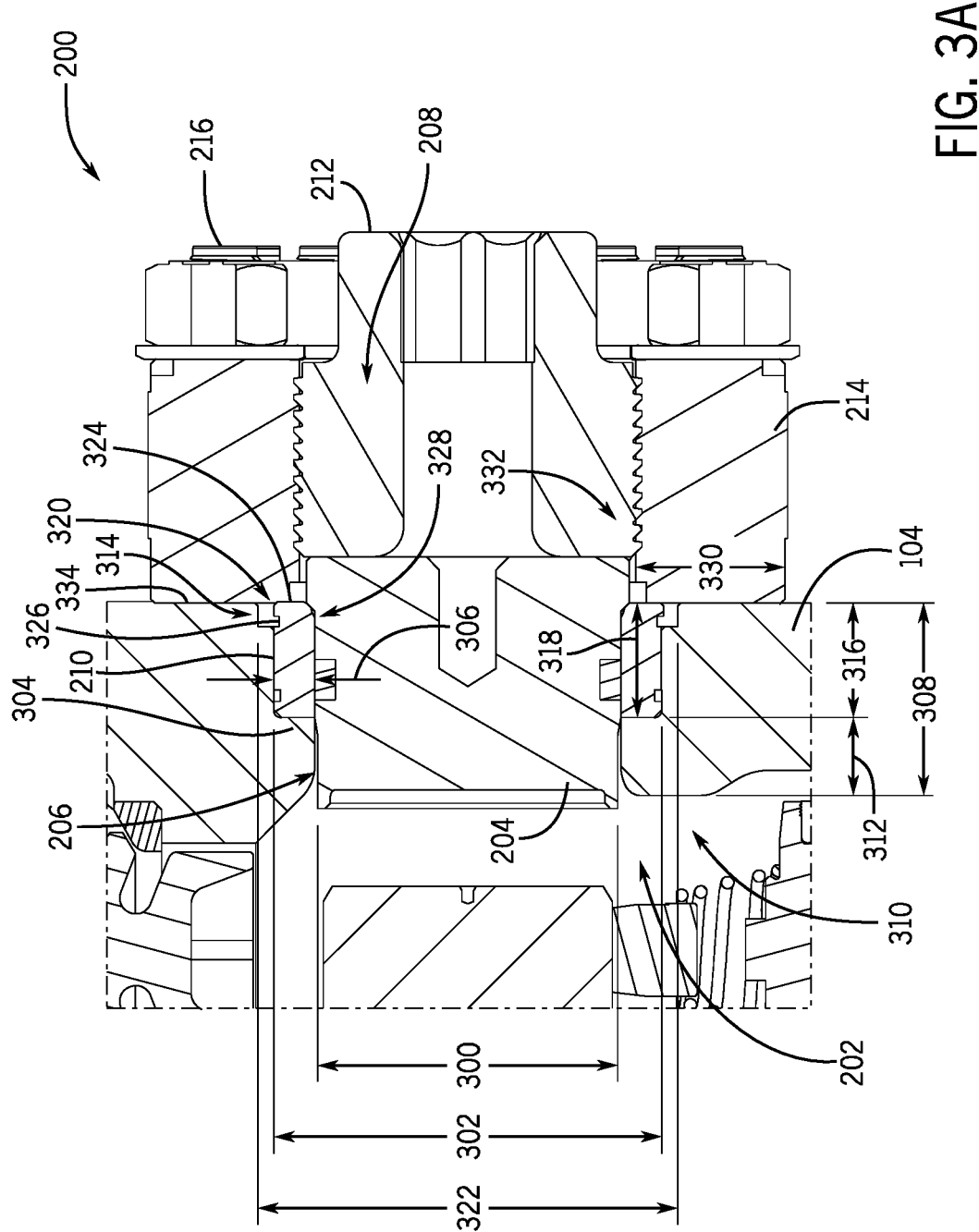
FIGS. 3A and 3B are detailed schematic cross-sectional views of embodiments of a suction sleeve assembly, in accordance with embodiments of the present disclosure.
Figure 3B:
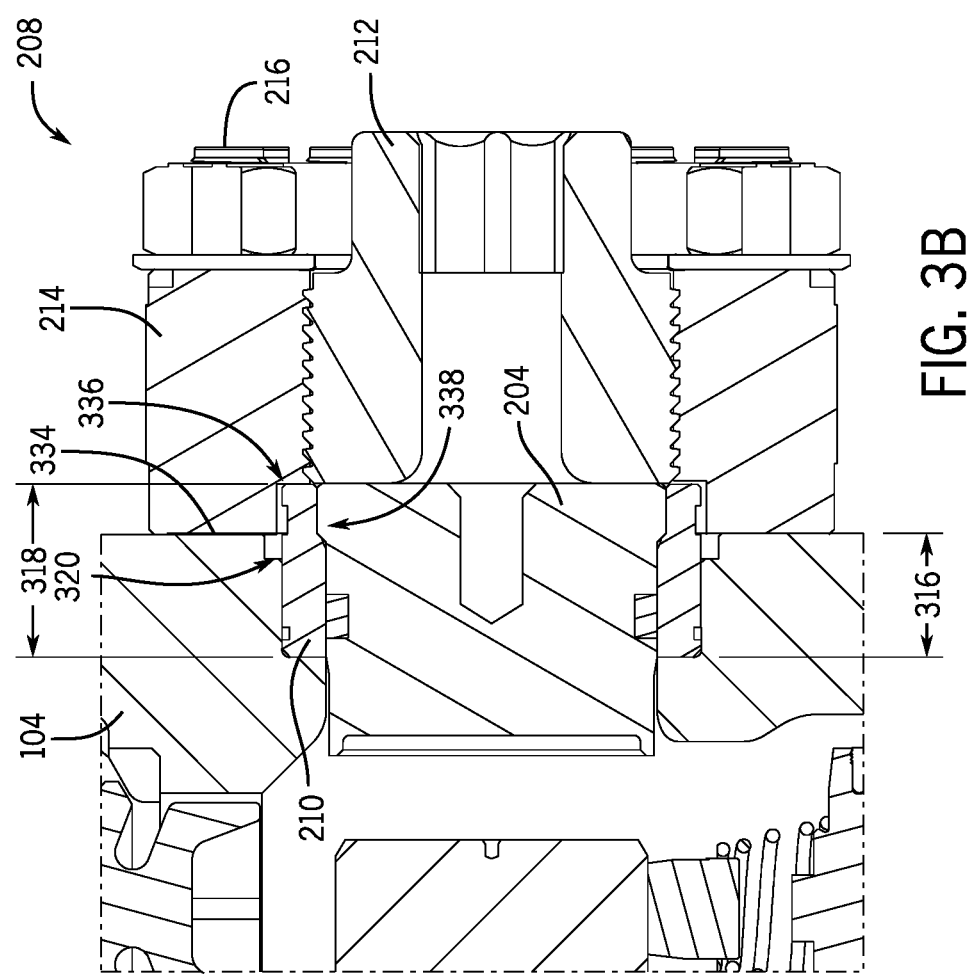

FIGS. 3A and 3B are detailed cross-sectional view of embodiments of the suction end 200 including the suction sleeve assembly 208. It should be appreciated that one or more features between FIGS. 3A and 3B may be shared, and as a result, certain elements may not be repeated for clarity and conciseness. In this configuration, the suction sleeve assembly 208 includes the suction cover 204 positioned within the suction bore 206. The suction cover 204 is retained within the bore 206 via the cover retainer 212, which is coupled to the suction ring 214. The suction ring 214 may be secured to the block 104 via one or more fasteners 216, but it should be appreciated that alternative configurations may include additional or alternative coupling solutions for securing the suction cover 204, cover retainer 212, and/or suction ring 214 to the block 104. By way of example only, additional coupling solutions may include one or more of bolts, bayonet connections, clamps, latches, and the like.

In the illustrated example, the suction bore 206 includes a first diameter 300 and a second diameter 302 with a shoulder 304 at a transition between the two. As shown, the first diameter 300 is smaller than the second diameter 302 and the suction sleeve 210 is arranged along the second diameter 302. In various embodiments, the suction sleeve 210 may extend, at least partially, into the first diameter 300. That is, a width or thickness 306 of the suction sleeve 210 may be greater than a difference between the first diameter 300 and the second diameter 302. In other embodiments, the width 306 of the suction sleeve 210 may be substantially equal to or less than the difference between the first diameter 300 and the second diameter 302.

The illustrated suction bore 206 further extends for a length 308, with a first portion 310 corresponding to an area that includes the first diameter 300 having a first length 312 and a second portion 314 corresponding to an area that includes the second diameter 302 having a second length 316. In this example, a sleeve length 318 is substantially equal to the second length 316. However, it should be appreciated that the sleeve length 318 may be greater than or less than the second length 316. For example, in various embodiments, the sleeve 310 may extend axially beyond the block 104.

Further illustrated in FIG. 3A is a groove 320 is arranged to extend into the block 104, where a groove diameter 322 is larger than the second diameter 302. In various embodiments, the groove 320 may be considered a part of the second portion 314. In other embodiments, the groove 320 is not a part of the second portion 314. In certain embodiments, the sleeve 310 includes an outwardly extending arm 324 that extends, at least in part, into the groove 320. In other embodiments, the groove 320 is positioned to provide a space for a removal tool to engage a cutout 326 that is formed within the sleeve 210. For example, the cutout 326 may be positioned to receive one or more removal tools that may engage the sleeve 210.

In operation, the sleeve 210 may be formed from one or more materials that are particularly selected to wear or otherwise failure prior to failure of various components of the block 104. For example, the sleeve 210 may be formed from a less strong material or a material with reduced corrosion resistance when compared to the fluid end block 104. However, it should be appreciated that, in other embodiments, the sleeve 210 may be formed from any reasonable material. Moreover, the sleeve 210 may be formed from a material with a higher hardness or more corrosion resistance when compared to one or more components of the fluid end block 104.

Various embodiments of the present disclosure illustrate the sleeve 210 positioned within the second portion 314 such that the sleeve 210 rests on and/or engages the shoulder 304. In this example, the sleeve 210 extends along the length 318 and includes the extending arm 324 and cutout 326. In this configuration, both the extending arm 324 and cutout 326 are substantially aligned with the groove 320 to enable, for example, a retrieval tool to engage the cutout 326. Further illustrated on an inner face is a slanted region 328. In various embodiments, the slanted region 328 engages at least a portion of the suction cover 204 such that further retention of the sleeve 210 may be facilitated by the suction cover 204, in addition to the suction ring 214. Moreover, as shown, one or more seals associated with the suction cover 204 may also bear against or otherwise engage the sleeve 210, which may block fluid flow between the suction cover 204 and the sleeve 210. It should be appreciated that the sleeve 210 may include one or more additional components such as grooves for seals, other notched or chamfered regions, and the like. In one or more embodiments, the suction cover 204 and the sleeve 210 are not coupled to one another (e.g., mechanically coupled), but may include one or more overlapping regions to block or otherwise prevent movement between the components in certain configurations.

The illustrated suction ring 214 is positioned over the bore 202 such that at least a portion of the suction ring 214 overlaps at least a portion of the second portion 314 and, in this configuration, the groove 320. For example, the illustrated suction ring 214 includes a width 330 that includes an inner end 332 positioned to overlap, at least in part, the suction sleeve 210. Accordingly, axial movement of the suction sleeve 210 is blocked when the suction ring 214 is coupled to the block 104. It should be appreciated that the suction ring 214 may be illustrated as abutting a face of the block 104, but in other embodiments one or more grooves or features may be arranged between the block 104 and/or the suction ring 214. Furthermore, one or more face seals may be positioned between the block 104 and the suction ring 214. The illustrated suction ring 214 further includes the fastening components, illustrated as threads, along an inner diameter to engage the cover retainer 212, as noted above. The cover retainer 212 is positioned to bear against and/or block axial movement of the suction cover 204. Moreover, in embodiments where the suction cover 204 restricts axial movement of the sleeve 210, the cover retainer 212 may further be utilized to block movement of the sleeve 210. In operation, the cover retainer 212 may be removed from the suction ring 214 without de-energizing the illustrated sleeve 210. That is, the suction ring 214 may maintain an axial force on the sleeve 210 such that removal of one or more of the cover retainer 212 and the suction cover 204 does not change or otherwise affect an axial movement of the sleeve 210. In this manner, different components of the fluid end 104 may be removed or scheduled for maintenance without affecting operation or causing additional maintenance on the sleeve 210.

FIG. 3B is a detailed cross-sectional view of an embodiment of the suction sleeve assembly 208 in which the sleeve 210 has the length 318 that is greater than the second length 316 such that the sleeve 210 extends axially beyond a face 334 of the block 104. That is, the sleeve 210 extends beyond the groove 320. As such, the illustrated suction ring 214 includes a notch 336 positioned to receive the additional axial length of the sleeve 210. When compared to the embodiment depicted in FIG. 3A, it can be seen that the sleeve 210 in FIG. 3B is engaged by a region within the notch 336, rather than by an axially lower portion of the suction ring 214, however, as shown, the notch 336 may also be included in the configuration of FIG. 3A. Further illustrated in FIG. 3B is a stepped region 338, which has replaced and/or elongated the slanted region 328 from the configuration of FIG. 3A to engage one or more portions of the suction cover 204.

In operation, the configuration shown in FIG. 3B may function in a substantially similar manner as FIG. 3A, where the suction ring 214 may engage the face 334 and be secured to the block 104 via one or more fasteners 216. The suction ring 214 may overlap at least a portion of the sleeve 210 to block axial movement, and moreover, in various embodiments portions of the suction cover 204 may also overlap the sleeve 210 to further block axial movement. However, as shown, in various embodiments the cover retainer 212 is secured to the suction ring 214, and as a result, removal of the suction ring 214 may also remove the cover retainer 212. But, removal of the cover retainer 212 and/or the suction cover 204 may not affect an axial location of the sleeve 210 due to the overlapping position of the suction ring 214. Furthermore, it should be appreciated that the suction ring 214 may further include one or more sealing elements with respect to various components, such as the face 334, sleeve 210, cover retainer 212, and the like.

FIG. 3C is a detailed cross-sectional view of an embodiment of the suction end 200 including a removal tool 340 for engaging and removing the sleeve 210. In this example, the removal tool 340 may also, in various embodiments, be utilized to remove the suction cover 204, for example in embodiments where the suction cover 204 partially overlaps the sleeve 210.

In this embodiment, the removal tool 340 is illustrated as a plate that includes an extrusion 342 that engages the cutout 326 formed within the sleeve 210. As shown, the cutout 326 forms a recessed portion that receives the extrusion 342 and, as a result, enables engagement between the sleeve 210 and the removal tool 340. Accordingly, an axial force may be applied to the sleeve 210 to direct the sleeve 210 out of the bore 202.

In the illustrated embodiment, removal of the sleeve 210 will also drive removal of the suction cover 204 due to the overlap at the stepped region 338. That is, interference at the stepped region 338 will apply a force to the suction cover 204 as the sleeve 210 is removed from the bore 202. In one or more embodiments, torque elements 344, shown here as threaded fasteners, may be utilized to apply a removal force to the sleeve 210. For example, the torque elements 344 may be rotated to drive an end into the face 334 and/or into the groove 320 or an associated fitting or aperture, to drive the plate of the removal tool 340 axially away from the face 334 and along the threaded fasteners, thereby applying a force to also carry the sleeve 210 out of the bore 202.

In various embodiments, the removal tool 340 may be formed from a partial ring or a segmented body to facilitate installation and insertion of the extrusion 342 into the cutout 326. For example, the removal tool 340 may extend for approximately 180 degrees to enable the removal tool 340 to slide or otherwise position the extrusion 342 within the cutout 326. Thereafter, forces applied to the removal tool 340 may be transferred to the sleeve 210 to drive the sleeve 210 out of the bore 202.

Figure 3D:
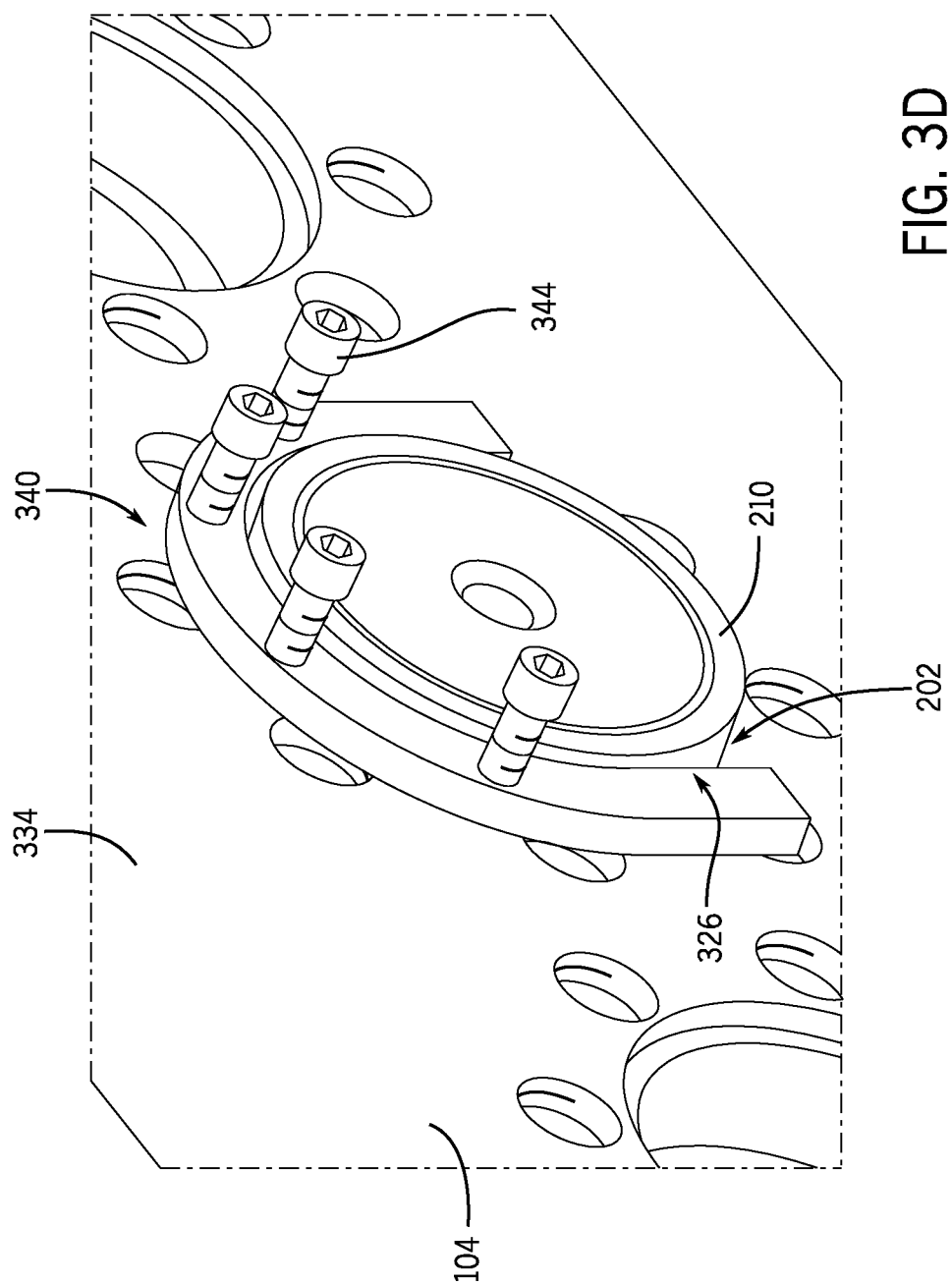
FIG. 3D is an isometric view of an embodiment of a suction sleeve assembly removal tool, in accordance with embodiments of the present disclosure.

FIG. 3D is an isometric view of an embodiment of the removal tool 340 arranged on the face 334 of the block 104. As noted above, the removal tool 340 is not a fully enclosed ring in the illustrated embodiment and includes open ends, which facilitate insertion of the extrusion 342 (not pictured) into the cutout 326. In one or more embodiments, the removal tool 340 may be positioned against the face 334 and then a force applied to the torque elements 344 may drive the removal tool 340, and as a result the sleeve 210, axially away from and out of the bore 202. This removal may be conducted in the field, rather than removing the fluid end 102 and transporting it to an offsite machine shop, which may result in more efficient maintenance/repairs along with reduced costs. Furthermore, in this example, specialized tooling may not be needed, as the torque elements 344 of the present embodiment are threaded fasteners.

Embodiments of the present disclosure may be directed toward the sleeved suction end where the sleeve is installed within a bore of the suction end. The sleeve may be positioned to receive abrasive forces from one or more fluids associated with the fluid end. In operation, the sleeve is energized and otherwise held in position by one or more suction rings, which may be directedly coupled to a face of the fluid end block. As a result, removal of associated components, such as the suction cover, may not deenergize or otherwise affect operation of the sleeve. In at least one embodiment, one or more removal tools may be utilized to engage one or more cutouts or features of the sleeve for removal. In at least one embodiment, removal may be conducted in the field.

Various embodiments of the present disclosure may be directed toward one or more valve sleeves that may be utilized with one or more valve assemblies associated with fracturing equipment, such as a fracturing pump. The one or more valves sleeves may be positioned at high friction, high impact, high failure areas and may, in certain embodiments, be formed from materials that are expected to last for a life of a fluid end, but it should be appreciated that other embodiments may form the valve sleeves as sacrificial components and/or from material that last longer than fluid ends. Furthermore, it should be appreciated that the materials utilized to form the valve sleeves may be any reasonable components for operation within the temperature, pressure, and environment associated with high pressure pumping, such as fracturing systems. Furthermore, systems may be adapted for use with lower pressure operations or with less abrasive fluid operations. In at least one embodiment, systems and methods are directed toward valve sleeves that will form at least a portion of an associated strike face for one or more valve members. In at least one embodiment, systems and methods are directed toward valve sleeves having cross-sectional appearances configured for removal after and replacement.

Figure 4A:
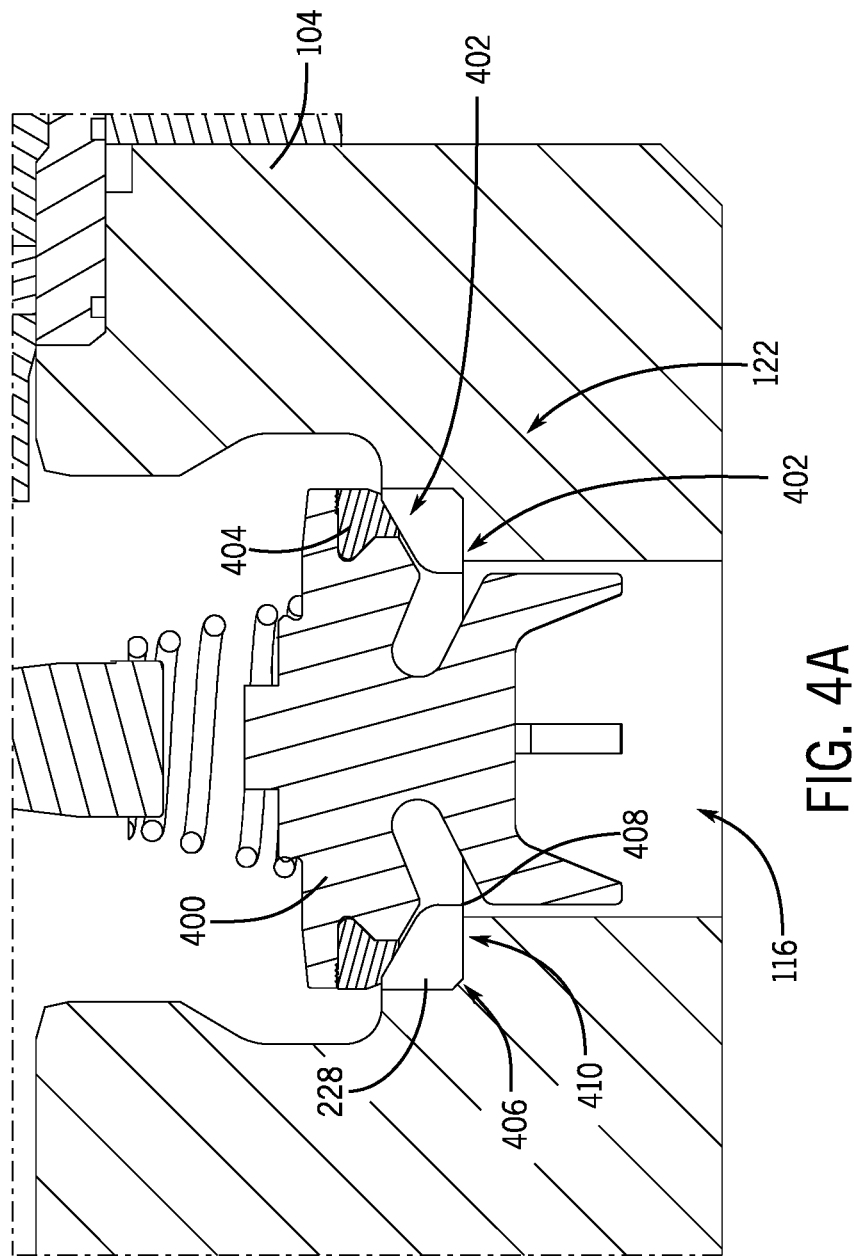

FIG. 4A is a detailed cross-sectional view of an embodiment of an inlet passage 116 that includes an inlet valve assembly 122. The inlet valve assembly 122 includes a valve member 400 that may reciprocate responsive to one or more pressures associated with the inlet valve assembly 122. For example, a pressure at a first end of the valve member 400 may drive the valve to an open position (not pictured) while a pressure at a second end of the valve member 400 may drive the valve to a closed position (pictured). In at least one embodiment, the valve member 400 includes a strike face 402 which may be positioned, at least in part, on one or more valve elements 404, which may be metallic, polymer, composite materials, or combinations thereof.

In the illustrated embodiment, an increased diameter portion 406 includes the valve sleeve 228, which in this example includes an overhang 408 that extends, at least partially, over the inlet passage 116. In various embodiments, the overhang 408 may be utilized for removal of the valve sleeve 228. For example, one or more tools may be utilized to extend into the block 104 to engage the overhang 408 and remove the valve sleeve 228, such as when the valve sleeve 228 is worn.

In this example, the valve sleeve 228 includes a cross-sectional shape that substantially conforms to a shoulder 410 formed along the inlet passage 116. That is, contrary to traditional configurations, the illustrated embodiment includes a substantially trapezoidal cross-section design that may eliminate one or more machining features associated with the block 104, such as including a machine taper to receive one or more sleeves. In one or more embodiments, the valve sleeve 228 may be considered a permanent or semi-permanent installation that is designed to last for a life of the block 104.

FIG. 4B is a detailed cross-sectional view of an embodiment of the valve sleeve 228 in which the overhang 408 shown in FIG. 4A has been removed. Accordingly, the valve sleeve 228 in this configuration sits entirely on the shoulder 410 and does not extend over the inlet passage 116. Such a configuration may further be utilized for embodiments where the valve sleeve 228 is a permanent or semi-permanent installation designed to last for substantially a life of the block 104.

Figure 5A:
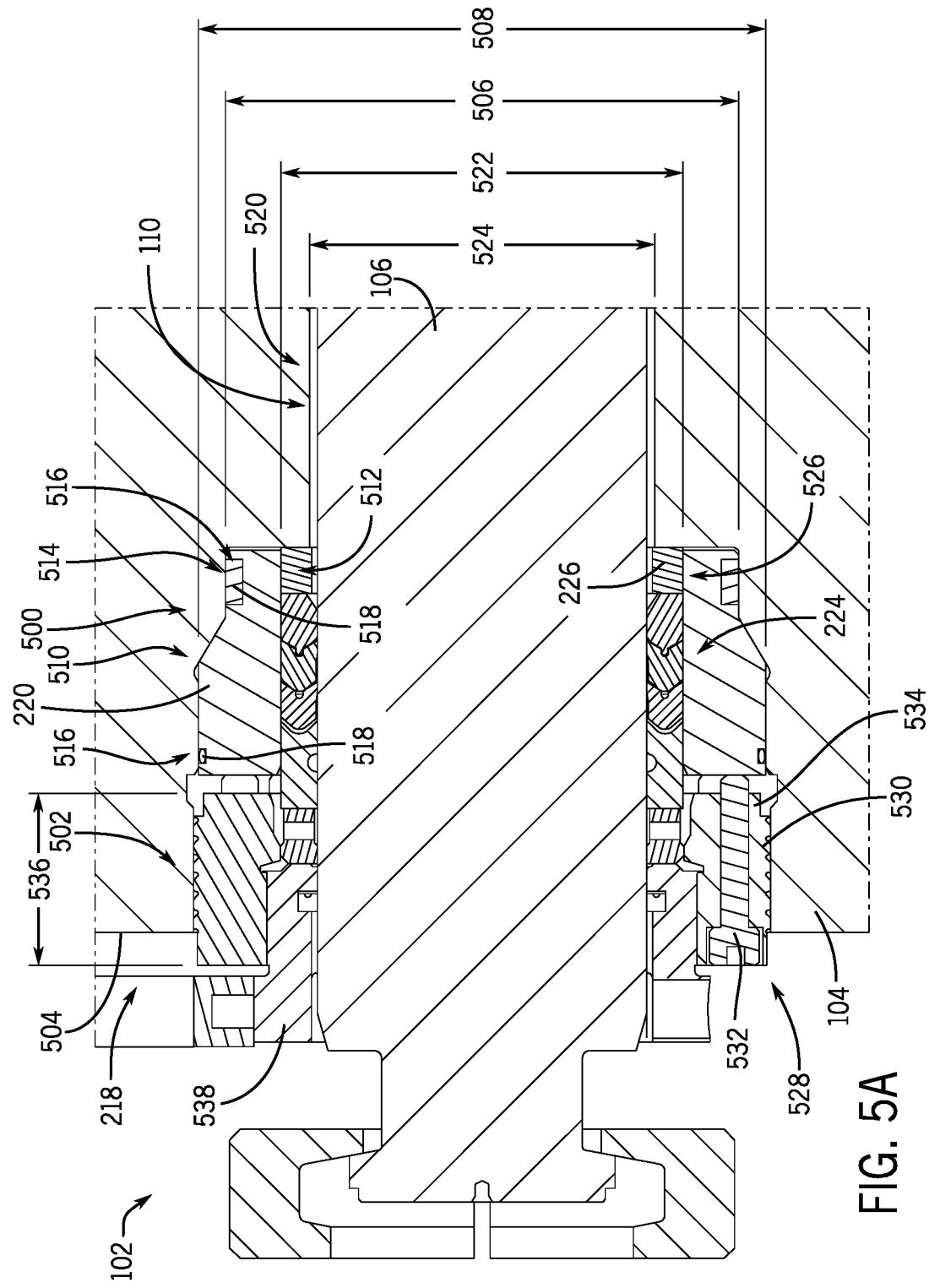
FIG. 5A is a detailed schematic cross-sectional view of an embodiment of a packing sleeve assembly, in accordance with embodiments of the present disclosure.

FIG. 5A is a detailed cross-sectional view of an embodiment of the packing sleeve assembly 218 positioned within the bore 110. Embodiments of the present disclosure may be directed toward one or more packing sleeves 220 arranged within the bore 110, or at least a portion of the bore 110, to facilitate operation of the fluid end 102. For example, the packing sleeves 220 may be utilized as sacrificial components that receive abrasive forces and wear quicker than the block 104. The packing sleeves 220 may be formed from a less expensive, less strong material and may be replaced more frequently than the fluid end and at a lower cost. Alternatively, the packing sleeves 220 may be formed from a material with a higher hardness value that may protect components of the block 104. Accordingly, systems and methods may be directed toward configurations that facilitate fluid ends that may be cheaper to manufacturer and/or cheaper to maintain.

In the illustrated embodiment, the packing sleeve 220 is arranged along the bore 110, which in this configuration includes a first bore section 500 and a second bore section 502. The first bore section 500 is closer to a chamber (not pictured) than the second bore section 502, which is closer to a face 504 of the block 104. As shown, the first bore section 500 has a first bore diameter 506 that is smaller than a second bore diameter 508, with a transition 510 between the first bore section 500 and the second bore section 502. In this example, the packing sleeve 220 is arranged such that it extends between the first bore section 500, the second bore section 502, and along the transition 510.

The illustrated packing sleeve 220 is an annular component that includes an inner bore 512 and an outer profile 514 that substantially conforms to the bore 110, as noted above. The outer profile 514 in this example includes grooves 516 that receive respective seals 518. It should be appreciated that more or fewer grooves 516 and/or seals 518 may be utilized in different embodiments, and moreover, the grooves 516 and/or seals 518 may be arranged in different locations. In this example, the inner bore 512 of the packing sleeve 220 does not extend toward a primary bore 520 associated with the plunger 106. That is, an inner bore diameter 522 is greater than a primary bore diameter 524, and is also less than both the first and second diameters 506, 508. Accordingly, a gap or region 526 is formed between the plunger 106 and the packing sleeve 220, which may be utilize for the packing components 224. For example, the packing components 224 in this embodiment are supported on the ring 226. As a result, as the plunger 106 reciprocates within the bore 110, the plunger may engage the packing components 224 and not the packing sleeve 220, which is radially outward and separated from the plunger 106 by the packing components 224 and the ring 226 in this example.

In one or more embodiments, the packing sleeve 220 is not mechanically coupled to the block 104 within the bore 110. That is, there are no mechanical coupling members, such as threads, within the bore 110 in the illustrated embodiment, it should be appreciated that alternative embodiments may include such features. In contrast, the illustrated embodiment includes a preloading system 528 that may be utilized to secure the packing sleeve 220 in position. This illustrated preloading system 528 includes a preloading body 530 in the form of an annular ring that may, in various embodiments, engage one or more components associated with the bore 110, such as threads in embodiments where the bore 110 includes threads. In this example, the preloading body 530 includes force members 532 that extend through the preloading body 530 and engage the packing sleeve 220. For example, the force members 532 may include one or more threaded components that extend through apertures 534 formed in the body 530. As the components are threaded into the apertures 534, the force members 532 may contact and apply a force to the packing sleeve 220, thereby preloading or compressing the packing sleeve 220 into the bore 110.

In various embodiments, the body 530 includes a body length 536 that is arranged to extend axially beyond the face 504. That is, the body 530 may be arranged partially within the bore 110 and partially outside of the bore 110. In at least one embodiment, the body 530 may be secured to the face 504 using one or more fasteners or retaining systems. In this example, the body 530 may interact with a packing retainer 538 such that at least a portion of the packing retainer 538 overlaps at least a portion of the body 530, thereby blocking axial movement of the body 530. In one or more embodiments, the packing retainer 538 may thread or otherwise mechanically couple to the body 530. In other embodiments, the packing retainer 538 may thread or otherwise mechanically couple to one or more retaining systems positioned outside of the bore 110.

As shown in FIG. 5A, embodiments of the present disclosure enable the packing components 224 to be axially arranged and secured within the bore 110 without utilizing the packing sleeve 220 for axial support. That is, moving axially outward from the chamber (not pictured), the illustrated embodiment shows axial support for the packing components 224 in the form of the ring 226, following by the packing components 224, and then compression or retention using the packing retainer 538. Furthermore, the packing retainer 538 may also, at least in part, support or otherwise position one or more components of the preloading system 528 within at least a portion of the bore 110. Such a configuration may enable removal of the packing components 224 without disengaging or unloading the packing sleeve 220, for example in configurations where the packing retainer 538 does not maintain positions of the preloading system 528.

Figure 5B:
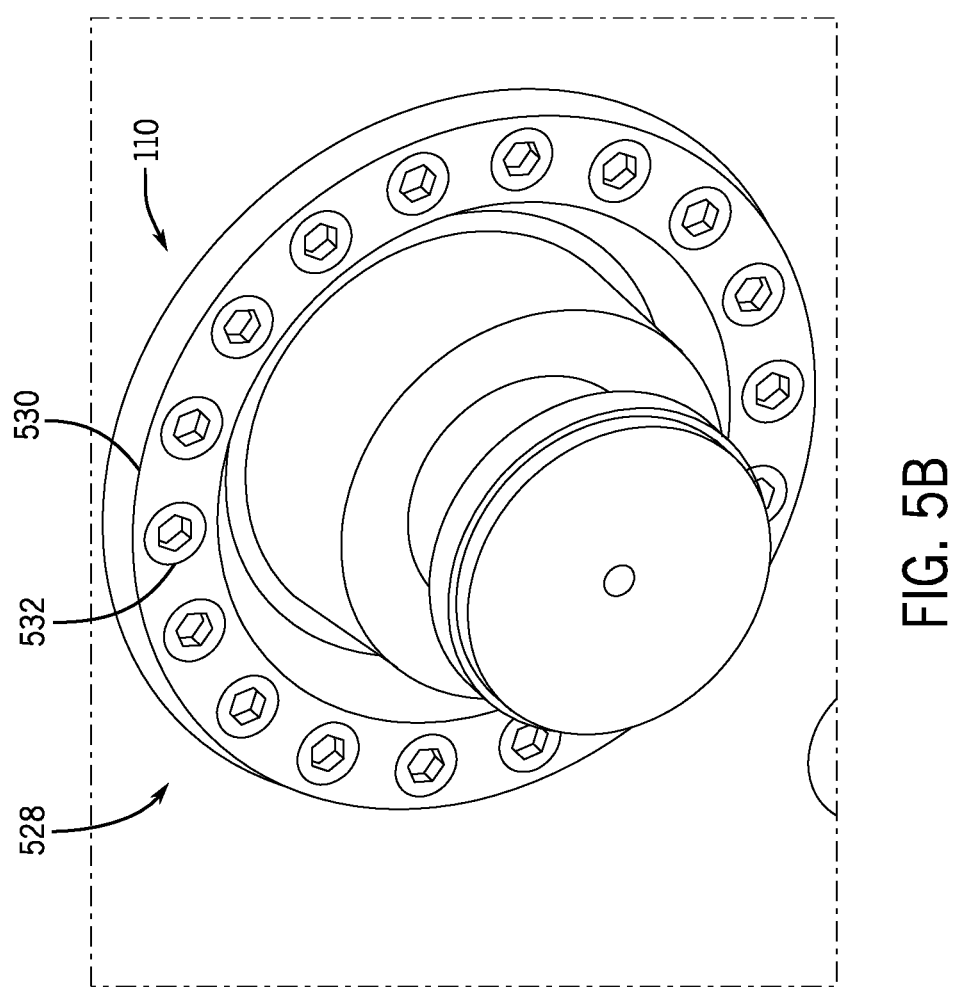
FIG. 5B is an isometric view of an embodiment of a packing sleeve assembly, in accordance with embodiments of the present disclosure.

FIG. 5B is an isometric view of an embodiment of preloading system 528 illustrating the preloading body 530 positioned, at least partially, within the bore 110. In this example, the force members 532 are illustrated as threaded components that may be utilized to apply an axial force to the packing sleeve 220 (not pictured) within the bore 110. It should be appreciated that the packing retainer 538 is removed for clarity. In this example, no threads or mechanical coupling components are illustrated along an inner bore of the body 530, but it should be appreciated that other embodiments may include threads, fittings, bayonet connections, and the like.

Figure 5C:
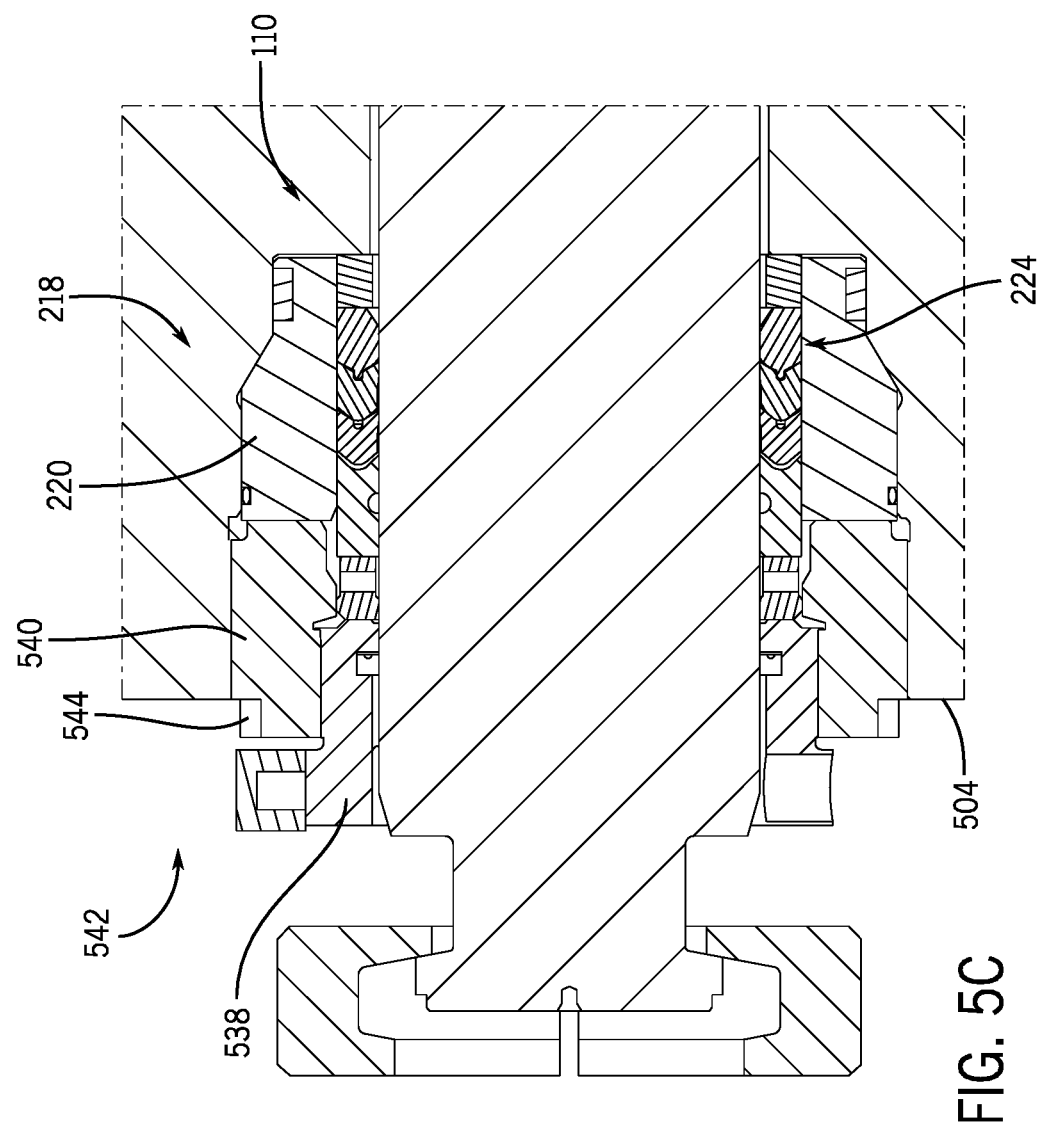
FIG. 5C is a detailed schematic cross-sectional view of an embodiment of a packing sleeve assembly, in accordance with embodiments of the present disclosure.

FIG. 5C is a detailed cross-sectional view of an embodiment of the packing sleeve assembly 218 illustrating the packing sleeve 220 arranged within the bore 110. In this example, the preloading system 528 shown in FIGS. 5A and 5B has been replaced with a packing sleeve retainer 540. The packing sleeve retainer 540 is positioned, at least partially, within the bore 110 and engages the packing sleeve 220, thereby blocking axial forces in a direction out of the bore 110 (e.g., toward the face 504). In this example, the packing retainer 538 engages the packing sleeve retainer 540, for example via one or more mechanical connectors, such as threads or the like, as noted here. As a result, the packing sleeve 220 and the packing components 224 may both be secured within the bore 110.

Embodiments of the present disclosure may further include one or more external fasteners 542, which may be secured to otherwise associated with the packing retainer 538, and in various embodiments, may be utilized to either maintain a position of the packing retainer 538 and/or packing sleeve retainer 540 and/or to provide a visual indication regarding rotation of the packing retainer 538 and/or packing sleeve retainer 540. By way of example, in one or more embodiments the packing sleeve retainer 540 may include one or more apertures 544 to receive one or more fasteners to lock or otherwise secure packing sleeve 540 to the fluid end block 104. Moreover, in various embodiments, external fasteners 542 may also be associated with the packing retainer 538.

Figure 5D:
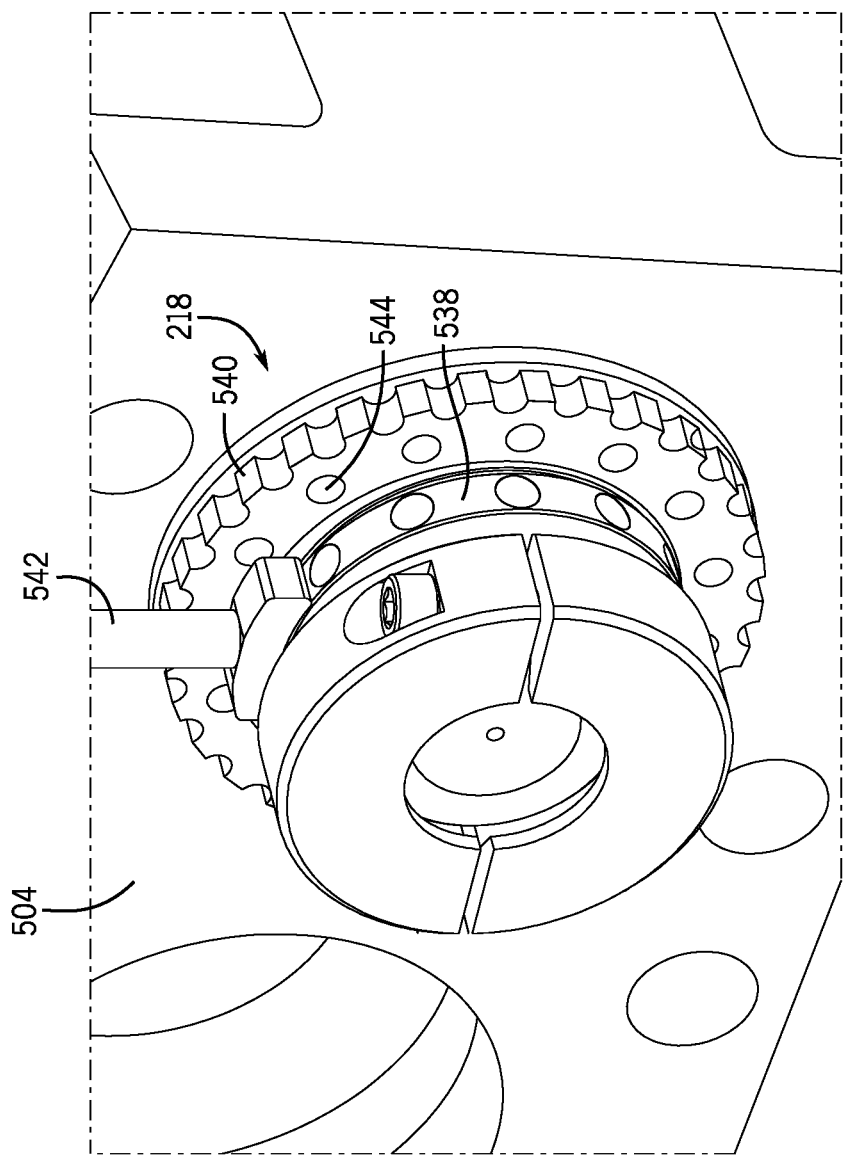
FIG. 5D is an isometric view of an embodiment of a packing sleeve assembly, in accordance with embodiments of the present disclosure.

FIG. 5D is an isometric view of an embodiment of the packing sleeve assembly 218 in which one or more components are blocked due to the position of the packing retainer 538 and/or the packing sleeve retainer 540. As shown in this example, one or more external fasteners 542 may be utilized to seal or secure one or more components in a particular location. For example, fasteners may extend through apertures 544 within the packing sleeve retainer 540. In at least one embodiment, the external fasteners 542 may couple directly to the face 504.

Figure 5E:
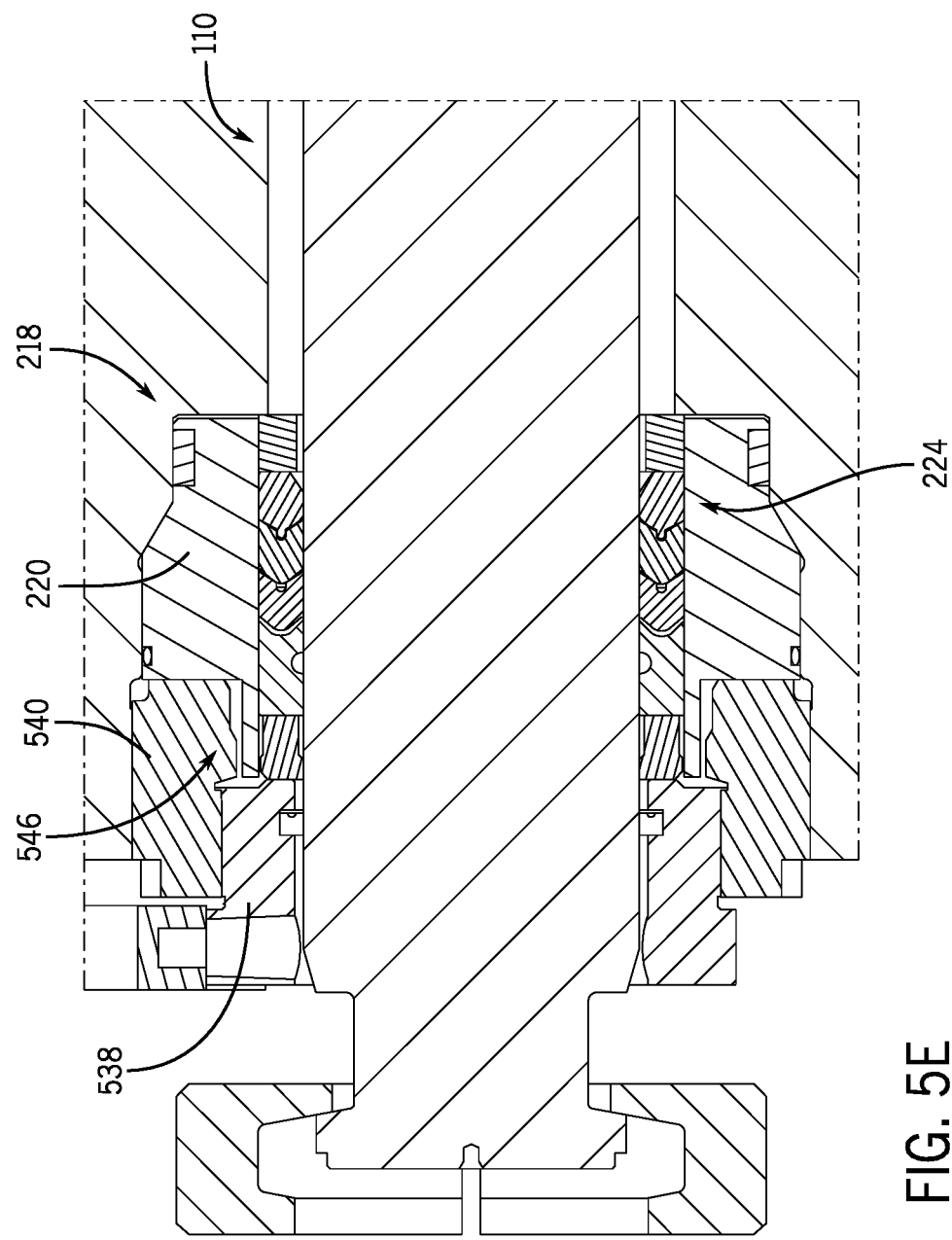
FIG. 5E is a detailed schematic cross-sectional view of an embodiment of a packing sleeve assembly, in accordance with embodiments of the present disclosure.

FIG. 5E is a detailed cross-sectional view of an embodiment of the packing sleeve assembly 218 in which the packing sleeve 220 includes an axial arm 546 that axial along the bore 110 to overlap at least a portion of the packing sleeve retainer 540. In this example, the arm 546 may be further utilized to provide guidance or structure to the packing components 224, which in this example extend along the arm 546. In various embodiments, the arm 546 does not contact the packing retainer 538. In at least one embodiment, the arm 546 does contact the packing retainer 538.

In at least one embodiment, the axial arm 546 enables a size of the packing components 224 to be adjusted while still enabling use of the retainer 540. In at least one embodiment, one or more portions of the packing retainer 538 may be particularly selected based, at least in part, on the packing components 224 selected and utilized. By way of example, a length of the packing retainer 538 may be adjusted if the packing components 224 have a longer or shorter axial length.

In one or more embodiments, features of the packing sleeve retainer 540 may engage or otherwise contact the arm 546. For example, the arm 546 may be compresses against one or more features of the packing sleeve retainer 540. Furthermore, the arm 546 may be used to center or otherwise guide the packing sleeve retainer 540 into the bore 110. In at least one embodiment, the arm includes a notch or recess to receive at least a portion of the packing sleeve retainer 540.

Figure 5F:
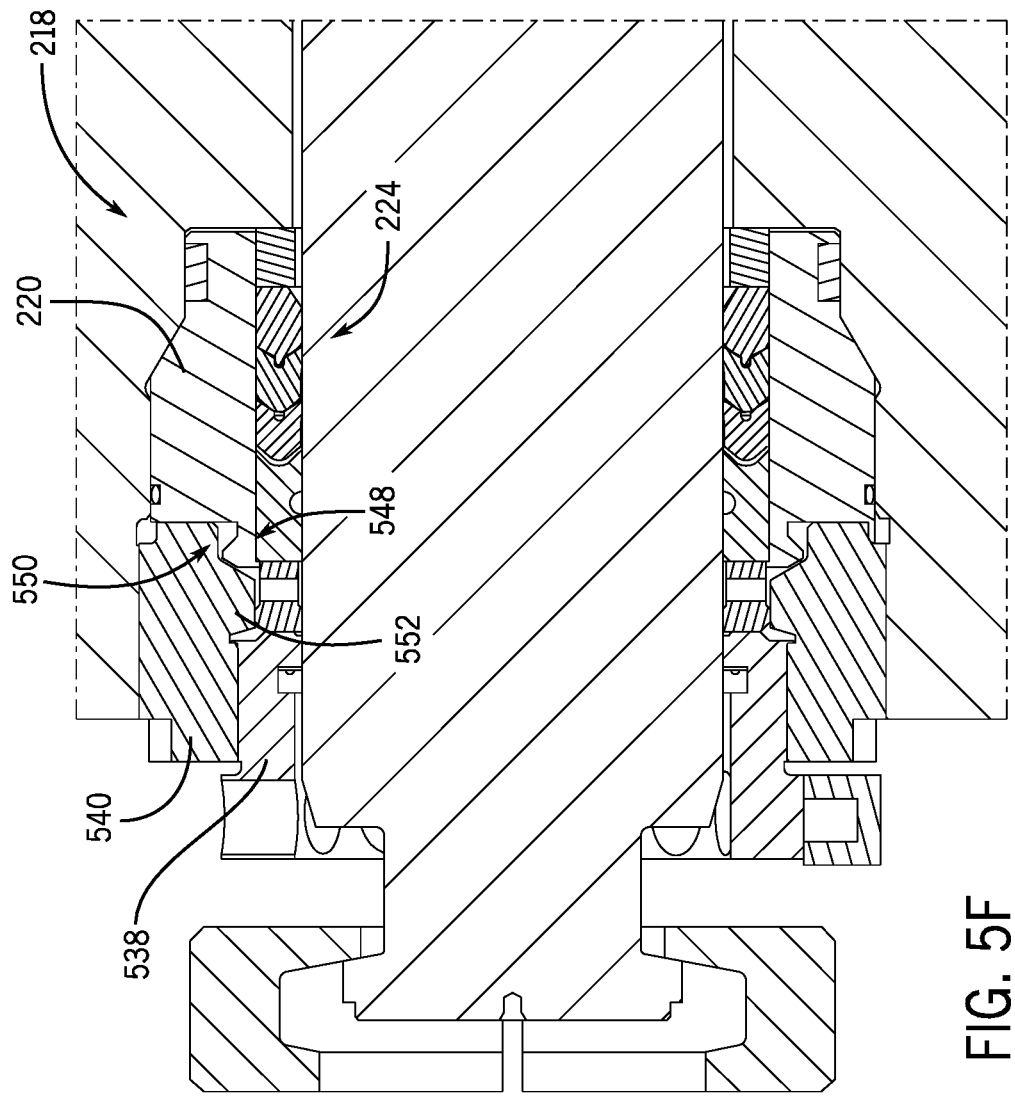
FIG. 5F is a detailed schematic cross-sectional view of an embodiment of a packing sleeve assembly, in accordance with embodiments of the present disclosure.

FIG. 5F includes a detailed cross-sectional view of an embodiment of the packing sleeve assembly 218 in which one or more modifications are made to the packing sleeve 220 and the packing sleeve retainer 540 when compared to embodiments of FIGS. 5A-5E. By way of example, the illustrated packing sleeve 220 includes an extension 548 forming a pocket 550. In this example, the extension 548 is shorter than the arm 546 of FIG. 5E and is not positioned to fully support the packing components 224. In at least one embodiment, at least a portion of the packing sleeve retainer 540 may engage or otherwise interact with at least a portion of the extension 548 and/or the pocket 550, for example to hook or otherwise couple components together.

Further illustrated in FIG. 5F is a projection 552 associated with the packing sleeve retainer 540. In this example, the projection 552 overlaps at least a portion of the extension 548 and, in various embodiments, may guide or otherwise support at least some of the packing components 224. It should be appreciated that, in this example, the packing retainer 538 overlaps a portion of the projection 552. As a result, removal of the packing sleeve retainer 540 may also drive removal of the packing retainer 538. For example, an axial force applied to the packing sleeve retainer 540 may be transmitted to the packing retainer 538 through contact with the project 552 and the packing retainer 538. However, as noted above, in various embodiments the packing retainer 538 is already coupled to the packing sleeve retainer 540.

In at least one embodiment, various components may also be adjusted by using different types or sizes of sleeves 220. By way of example only, a plunger size may be changed by using a larger or smaller sleeve 220. Moreover, adjustments to the packing components 224, such as those noted above, may also enable the use of different sized plungers, which may provide more flexibility to operators. In at least one embodiment, various components associated with fluid ends may stay the same while adjustments to one or more of the plunger 106, packing components 224, plunger sleeve 220, and/or packing nut 538, thereby enabling adjustments to various operating conditions without modifying or changing significant portions of the fluid end.

Figure 5G:
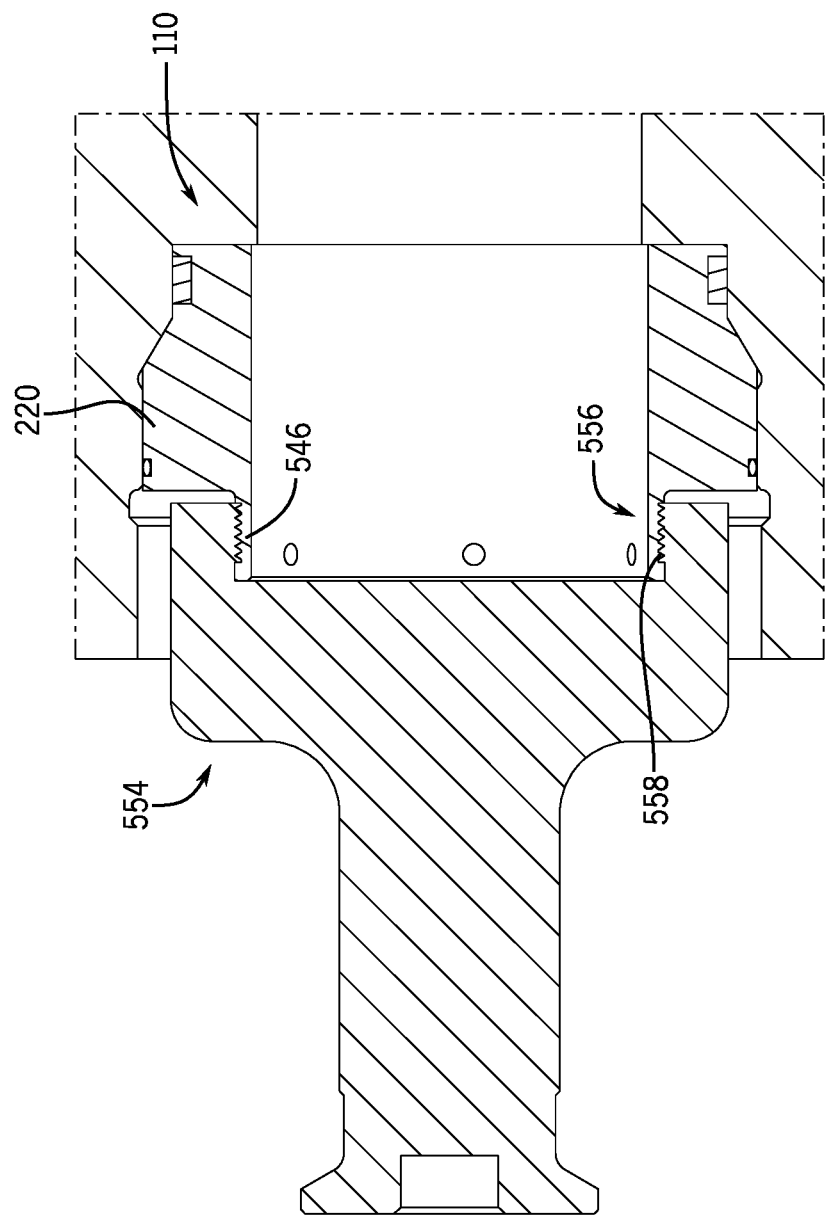
FIGS. 5G-5J are detailed schematic cross-sectional views of embodiments of a packing sleeve assembly removal tool, in accordance with embodiments of the present disclosure.

FIG. 5G is a cross-sectional view of an embodiment of a removal tool 554 that be utilized with one or more embodiments of the present disclosure to remove the packing sleeve 220 from the bore 110. In this example, the removal tool 554 is configured for operation with the embodiment of FIG. 5E including the arm 546, but it should be appreciated that various other embodiments may also be adapted for use with various embodiments described herein. In this example, the removal tool includes an opening 556 that receives the arm 546 and secures to the arm via one or more connectors 558, which are shown as threads. Thereafter, a force may be applied to the removal tool 554 to pull or otherwise remove the packing sleeve 220 from the bore 110. It should be appreciated that while embodiments illustrate the threads as the one or more connectors 558, various other embodiments may include connectors should as j-hooks, bayonet connectors, and the like. Moreover, various embodiments may also adjust a coupling location to a not engage the arm 546, but rather, an alternative region of the packing sleeve 220.

Figure 5H:
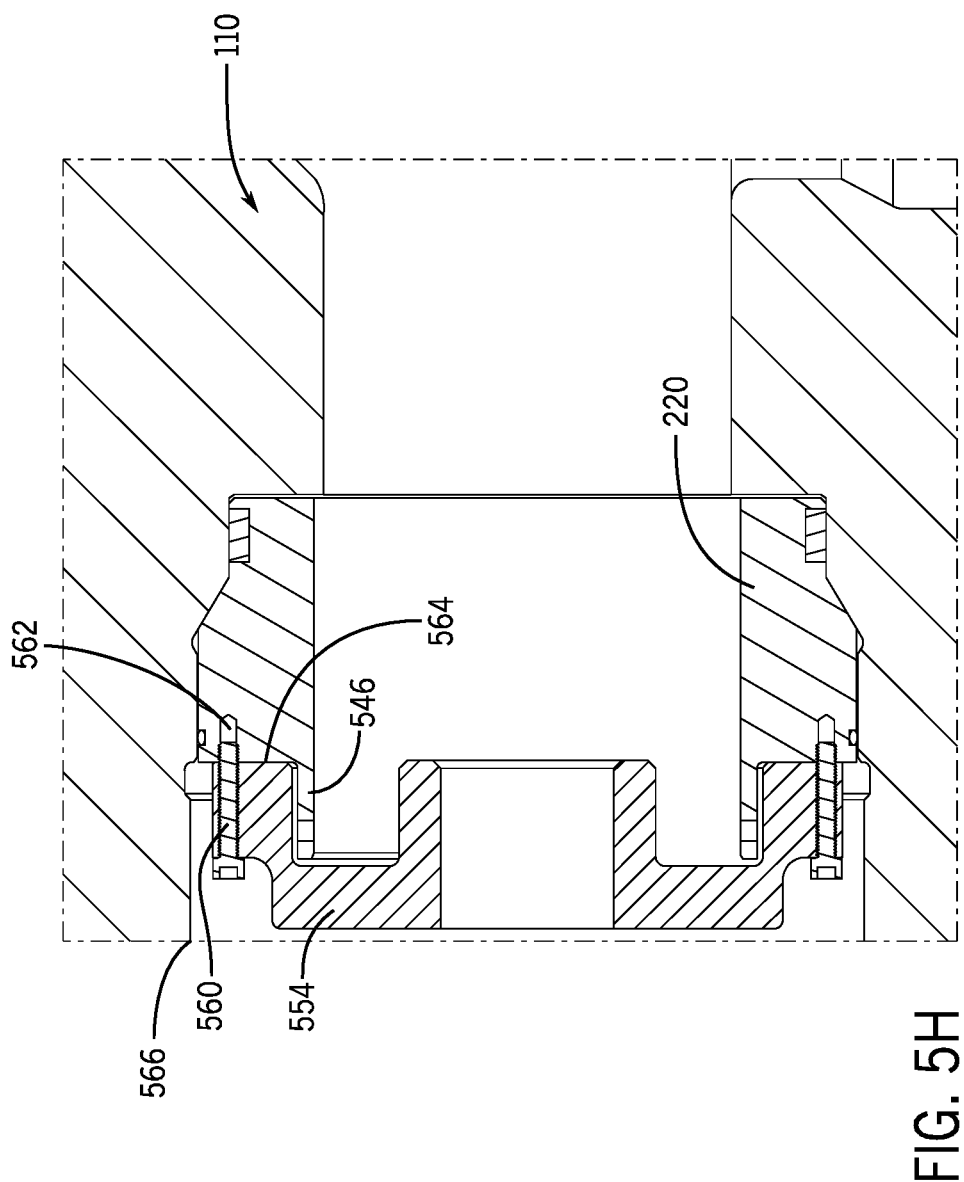

FIG. 5H is a cross-sectional view of an embodiment of the removal tool 554 in which one or more features have been adjusted compared to the tool 554 shown in FIG. 5G. In this example, rather than engaging the arms 546 as shown in FIG. 5G, the removal tool 554 includes one or more fasteners 560 that engage receptacles 562 formed in the packing sleeve 220. Accordingly, the arms 546 may be formed without threaded connections or other coupling components. In various embodiments, the opening 556 receives the arms 546 and a tool face 564 may engage the packing sleeve 220 to secure the fasteners 560 to the receptacles 562. Thereafter, an axial force may drive the tool 554, and along with it the sleeve 220, out of the bore 110.

Figure 5I:
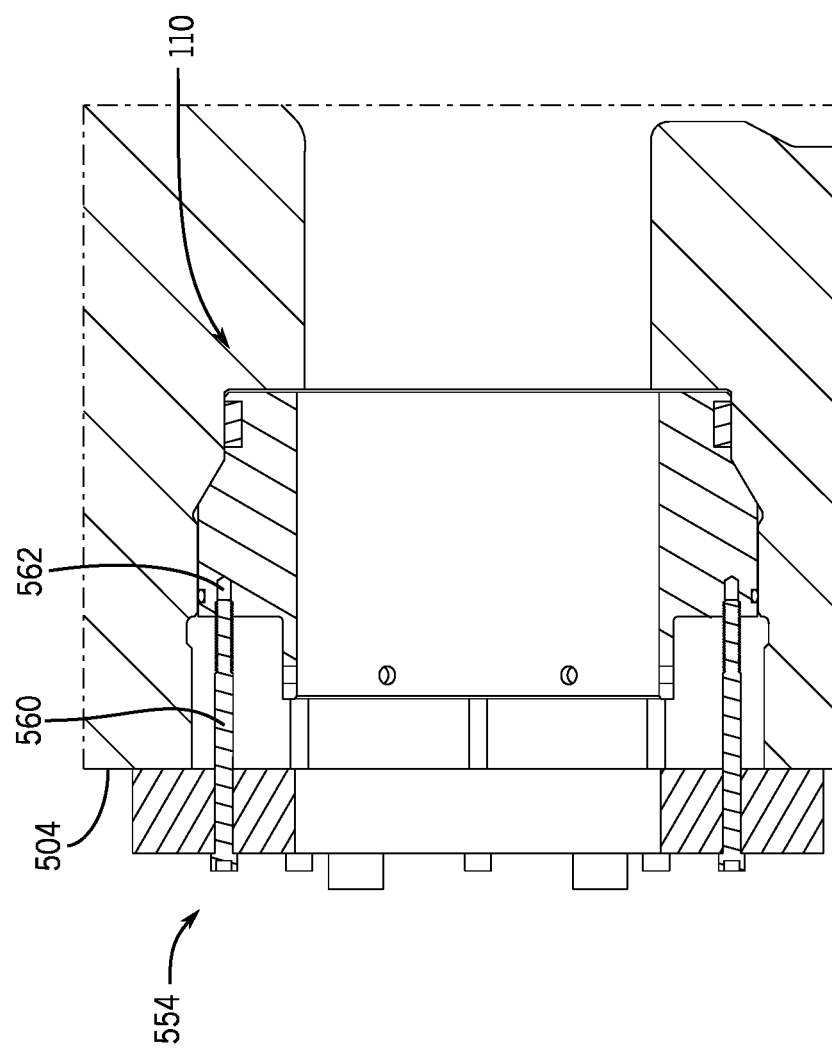

FIG. 5I is a cross-sectional view of an embodiment of the removal tool 554 in which one or more features have been adjusted compared to the tools 554 shown in FIGS. 5G and 5H. In this example, the removal tool 554 is coupled to the face 504, for example via one or more fasteners, and the one or more fasteners 560 extend through the bore 110 to the receptacles 562. As a result, the removal tool 554 may take the form of a plate that omits the opening 556 such that the plate does not extend into the bore 110, but rather, directs the one or more fasteners 560 into the bore 110.

Figure 5J:
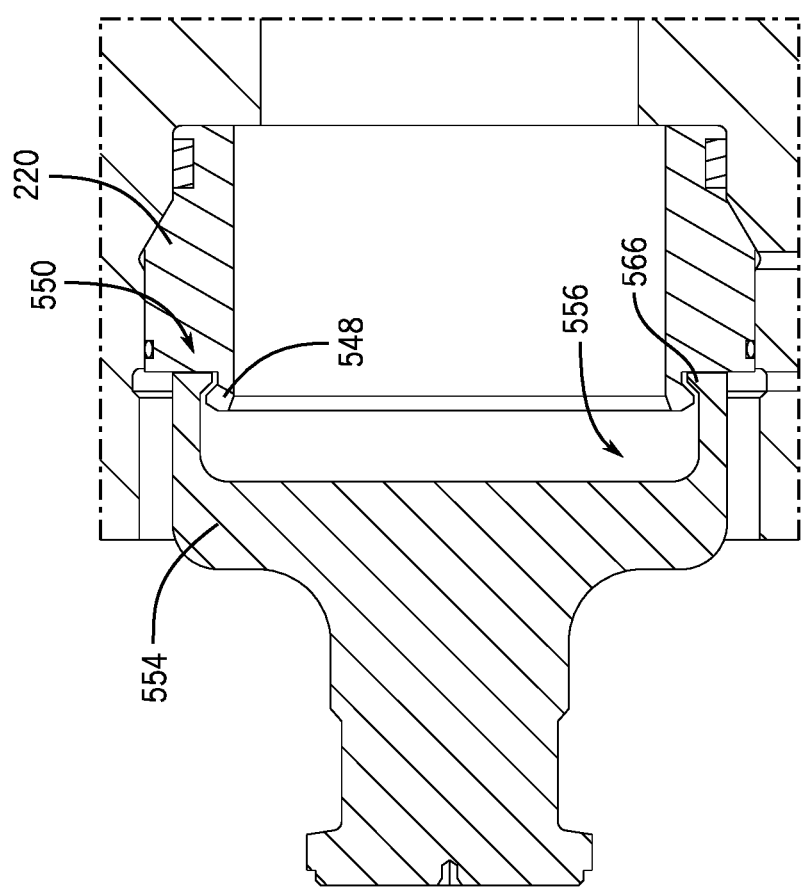

FIG. 5J is a cross-sectional view of an embodiment of the removal tool 554 in which one or more features have been adjusted compared to the tools 554 shown in FIGS. 5G-5I. For example, the illustrated tool 554 may be configured for use with the embodiments shown in FIG. 5F to engage the extension 548 and/or the pocket 550. The illustrated example includes the tool 554 having the opening 556 that receives the extension 548. In one or more embodiments, a lip 566 extends inwardly into the opening 556 to engage the pocket 550. In certain embodiments, embodiments, the lip 566 may bend, stretch, snap, or otherwise deform when being positioned into place and then return back into position to engage the pocket 550. In certain embodiments, the lip 566 and/or the pocket 550 may include openings or slots, such as bayonet connectors, where the lip 566 is moved through an opening and then rotated to engage the extension 548 for removal. Accordingly, the tool 554 may engage the pocket 550 to facilitate removal of the packing sleeve 220.

Figure 5K:
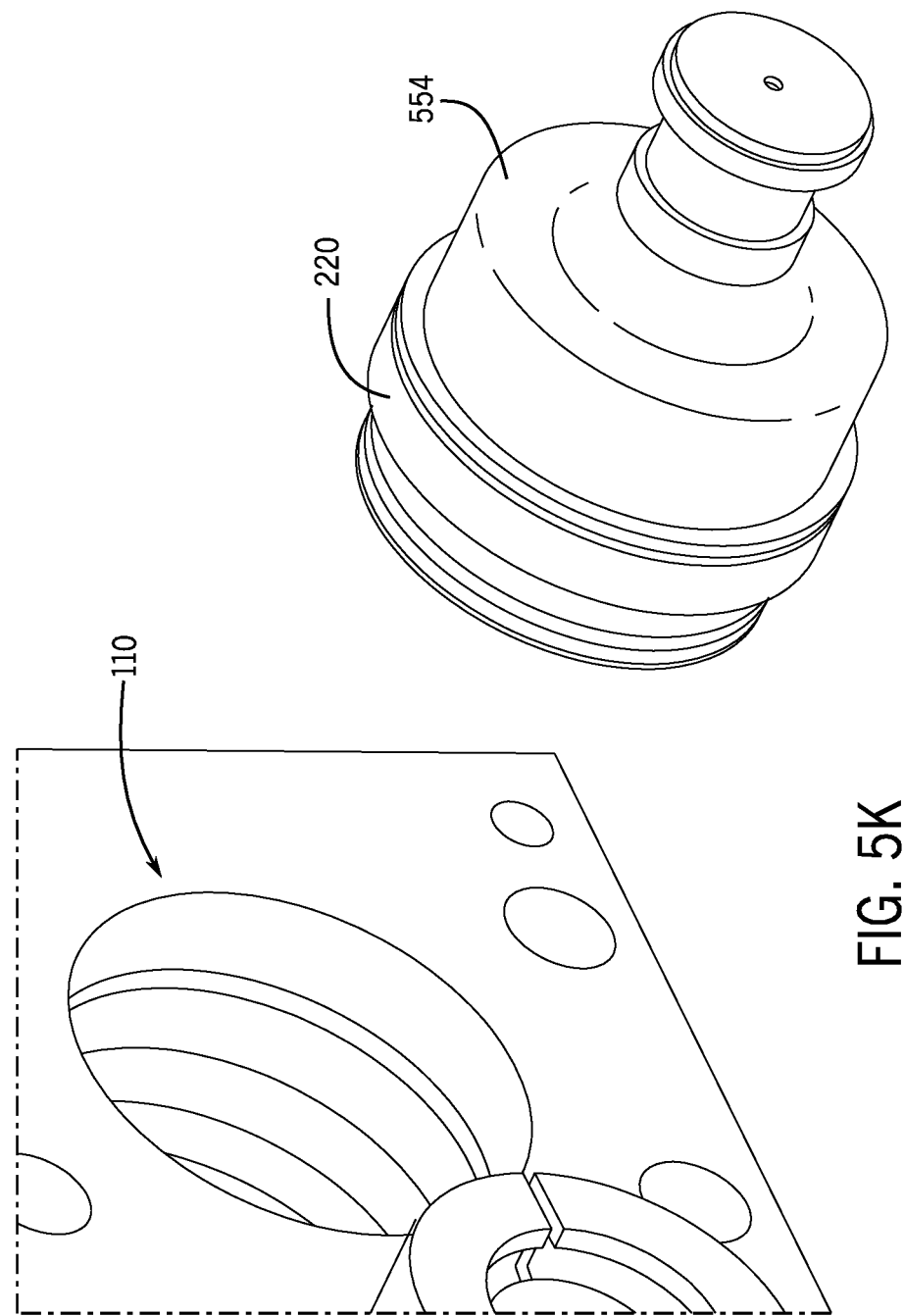
FIG. 5K is an isometric view of an embodiment of a packing sleeve assembly removal operation, in accordance with embodiments of the present disclosure.

FIG. 5K is an isometric view of an embodiment of the removal tool 554 coupled to the packing sleeve 220 after removal from the bore 110. As shown, the removal tool 554 may facilitate axial removal from the bore 110 by engaging the sleeve 220, which may then be replaced by a new sleeve 220, for example using the removal tool 554.

Figure 5L:
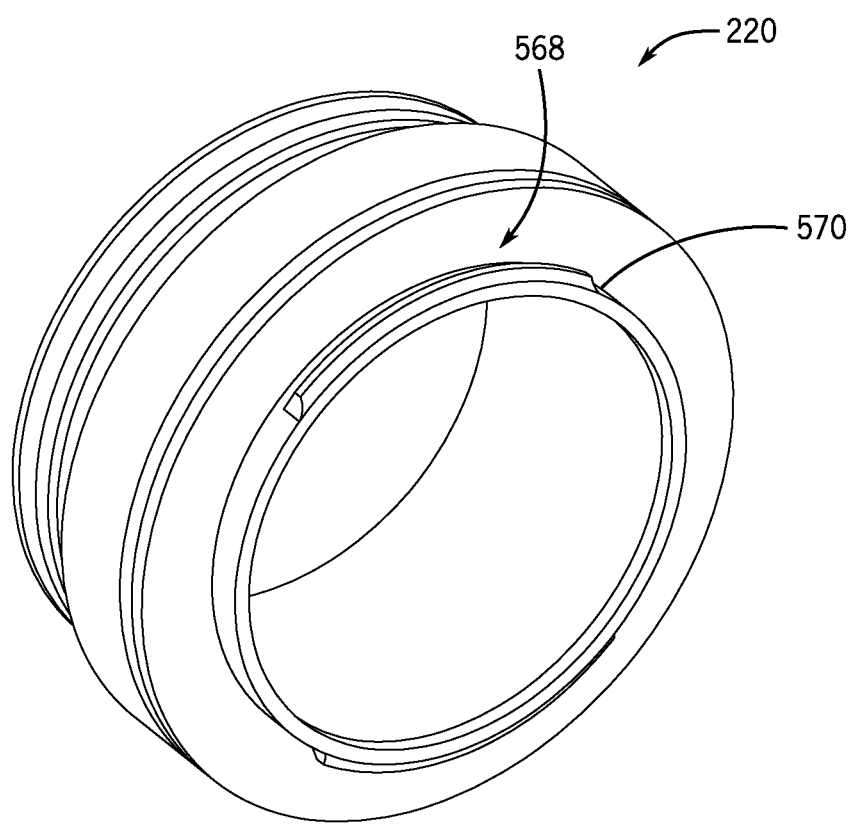
FIG. 5L is an isometric view of an embodiment of a packing sleeve, in accordance with embodiments of the present disclosure.

FIG. 5L is an isometric view of an embodiment of the packing sleeve 220 having a tool receiving configuration. As noted above, in various embodiments the lip 565 (not pictured) may enter into an opening 568 formed within the packing sleeve 220 and then, upon rotation, may be locked from axial movement due to alignment with one or more blocking features 570, such as an arm or a projection. In other words, the tool receiving configuration may be formulated as a type of bayonet connection in which axial movement of the tool 554 with respect to the sleeve 200 is enabled in one configuration and then blocked in another configuration.

Figure 5M:
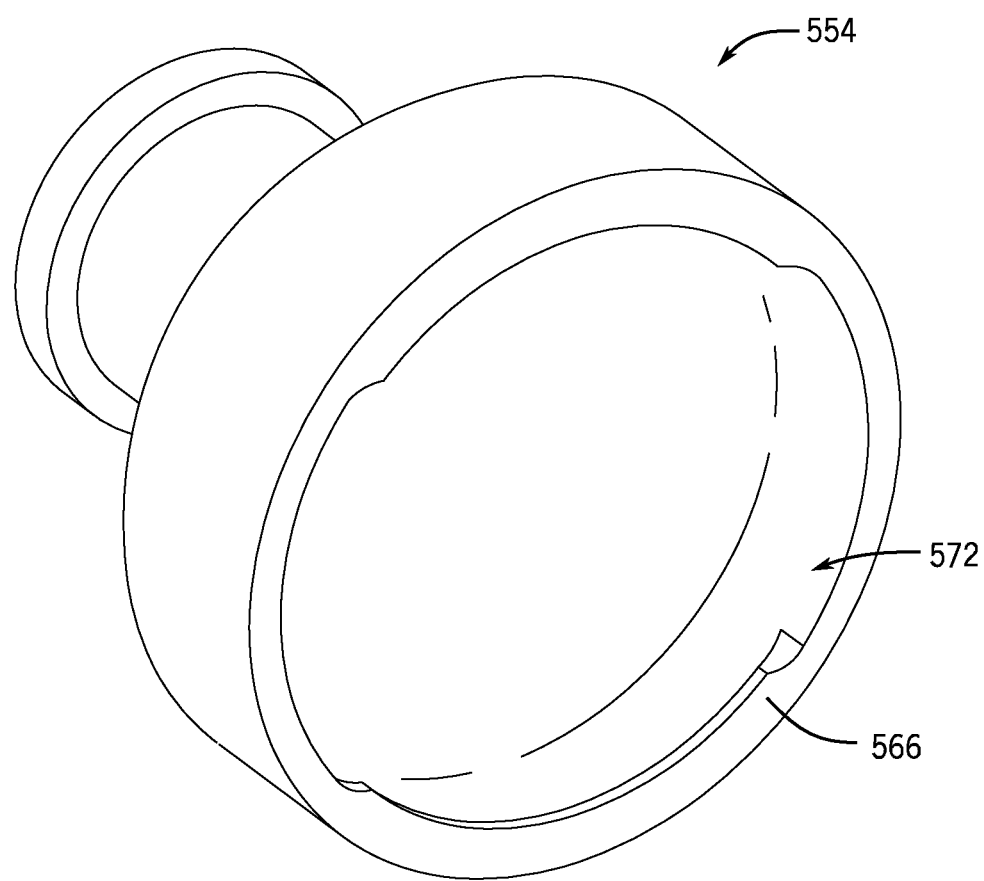
FIG. 5M is an isometric view of an embodiment of a packing sleeve assembly removal tool, in accordance with embodiments of the present disclosure.

FIG. 5M is an isometric view of the tool 554 that includes mating features for the tool receiving configuration of FIG. 5L. That is, the lip 566 is illustrated with corresponding openings 572 to allow for passage of the blocking features 570 to facilitate coupling between the tool 554 and the sleeve 200.

Figure 6:
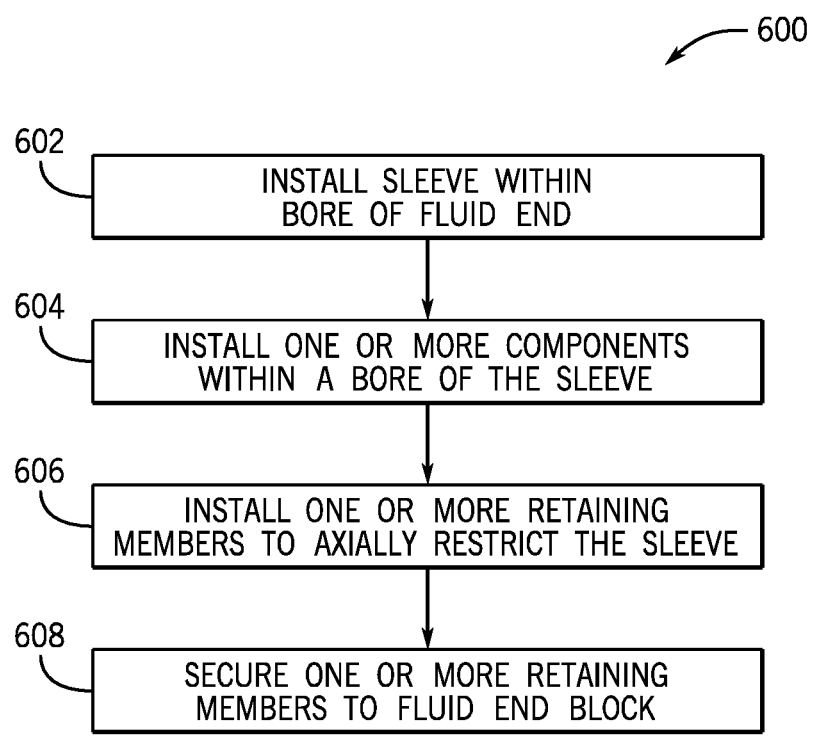
FIG. 6 is a flow chart of an embodiment of a method for assembling a pump assembly, in accordance with embodiments of the present disclosure.

FIG. 6 is a flow chart of an embodiment of a method 600 for installation and removal of a sleeve. It should be appreciated for this method, and all methods described herein, that there may be more or fewer steps. Additionally, the steps may be performed in a different order, or in parallel, unless otherwise specifically stated. In this example, a sleeve is installed within a bore of a fluid end 602. The sleeve may correspond to a suction sleeve, a valve sleeve, a packing sleeve, or any other sleeve associated with one or more bores. In various installation, installation of the sleeve may not include coupling or otherwise fastening the sleeve to the bore, for example, via fasteners or threaded components. In at least one embodiment, one or more components are installed within a bore of the sleeve 604. By way of example, packing components may be installed within the bore a packing sleeve or a suction cover may be installed within the bore for a suction sleeve. Various additional associated components may also be installed based, at least in part, on different design configurations and installation procedures. In at least one embodiment, one or more retaining members are installed to axially restrict the sleeve 606. By way of example only, a retaining member may correspond to a sleeve retainer that engages an end of the sleeve to block axial movement. The retaining members may then be secured to the fluid end block 608. In at least one embodiment, one or more fasteners are used to secure the retaining members to the fluid end block. However, it should be appreciated that, in other embodiments, the retaining members may be otherwise secured to block movement of the sleeve, such as to other corresponding components and the like. In this manner, various sleeves may be installed within fluid ends.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents. As will be described above, in one or more embodiments the packing sleeve 220 is secured to the block 104 using one or more fasteners that may extend through one or more intermediate components. In at least one embodiment, a retaining system may not include a preload element.

The invention claimed is:

1. A fluid end comprising:
a fluid end block having a first face, a second face, a plunger bore, and a suction bore;
a first sleeve assembly associated with the plunger bore, the first sleeve assembly comprising:
a packing sleeve positioned within the plunger bore, and
a packing sleeve retainer positioned at the plunger bore, thereby to axially retain the packing sleeve within the plunger bore, the packing sleeve retainer coupled to the first face of the fluid end block;
a second sleeve assembly associated with the suction bore, the second sleeve assembly comprising:
a suction sleeve positioned within the suction bore,
a suction cover positioned within the suction sleeve, and
a suction ring coupled to the second face of the fluid end block, thereby to axially retain the suction sleeve in the suction bore, the suction sleeve positioned between the suction bore and the suction cover; and
a suction seal positioned between the suction sleeve and the suction cover.

2. The fluid end of claim 1, further comprising packing components positioned within the plunger bore, the packing sleeve positioned radially outward from the packing components, and the packing components arranged radially between the packing sleeve and a reciprocating plunger when the fluid end is connected to a power end including the reciprocating plunger.

3. The fluid end of claim 1, wherein the packing sleeve retainer is positioned at least partially within the plunger bore and contacts the packing sleeve.

4. The fluid end of claim 1, wherein the plunger bore includes a primary bore, and the fluid end further comprising:
one or more packing components; and
a ring positioned between the packing sleeve and the primary bore, the ring axially supporting the one or more packing components.

5. The fluid end of claim 1, wherein the suction bore defines an increased diameter portion, wherein the suction sleeve is positioned within the increased diameter portion, and wherein the suction sleeve: includes a cutout configured to receive a removal tool.

6. The fluid end of claim 1, wherein the suction sleeve extends, at least partially, beyond the second face.

7. The fluid end of claim 1, further comprising:
one or more valve assemblies comprising respective valve members and respective strike faces; and
one or more valve sleeves associated with the one or more valve assemblies, at least a portion of the one or more valve sleeves defining a corresponding surface for the respective strike faces.

8. The fluid end of claim 7, wherein the fluid end block further has an inlet bore, the one or more valve sleeves including an overhang that extends into the inlet bore.

9. The fluid end of claim 1, wherein the packing sleeve retainer extends axially beyond the first face.

10. The fluid end of claim 1, wherein the packing sleeve retainer comprises:
a packing sleeve retainer body; and
one or more force members extending through the packing sleeve retainer body, the one or more force members contacting the packing sleeve, thereby to apply a preloading force to the packing sleeve responsive to an external force applied to the one or more force members.

11. A pump assembly; comprising:
the fluid end of claim 1, the fluid end block further having a third bore, a fourth bore, and an internal chamber, the plunger bore extending from the first face to the internal chamber, the suction bore extending from the second face to the internal chamber, the third bore and the fourth bore extending independently toward the internal chamber, the internal chamber connected to each of the plunger bore, the suction bore, the third bore, and the fourth bore;
a plunger arranged to reciprocate within the plunger bore;
packing components positioned radially between the packing sleeve and the plunger, the packing components positioned axially independent of the packing sleeve; and
a packing retainer associated with the packing sleeve retainer, thereby to block axial movement of the packing components.

12. The pump assembly of claim 11, further comprising:
a valve assembly comprising a valve member; and
a valve sleeve arranged within at least one of the third bore or the fourth bore, the valve sleeve positioned to interact with the valve member.

13. The pump assembly of claim 11, wherein the packing sleeve retainer comprises:
a body, and
a force member extending through the body, thereby to engage and preload the packing sleeve responsive to an external force applied to the force member.

14. The pump assembly of claim 11, wherein both the packing sleeve and the packing sleeve retainer are positioned radially outward from the packing components.

15. The pump assembly of claim 11, wherein the packing sleeve retainer is coupled to the packing retainer.

16. The pump assembly of claim 11, further comprising:
a packing sleeve removal tool, the packing sleeve removal tool configured to engage at least a portion of the packing sleeve after the packing sleeve retainer is removed from the fluid end block, thereby to couple to the packing sleeve when the packing sleeve removal tool is engaged with the at least a portion of the packing sleeve.

17. The pump assembly of claim 16, wherein the packing sleeve removal tool, when engaged with the at least a portion of the packing sleeve, is configured to engage at least one of (a) a threaded component associated with the packing sleeve, (b) a receptacle of the packing sleeve, or (c) a gap formed by at least a portion of the packing sleeve.

18. The pump assembly of claim 16, wherein;
the packing sleeve defines mating receptacles, and
the packing sleeve removal tool comprises:
a plate configured to be coupled to the first face of the fluid end block when the packing sleeve removal tool is engaged with the at least a portion of the packing sleeve, and
one or more fasteners configured to extend into the plunger bore when the packing sleeve removal tool is engaged with the at least a portion of the packing sleeve, the one or more fasteners engaging the mating receptacles of the packing sleeve.

19. The pump assembly of claim 16, wherein:
the suction sleeve defines a mating opening and a blocking feature, and the packing sleeve removal tool comprises:
- a bayonet connection including a lip and openings, the lip and openings configured to align with the mating opening and the blocking feature, thereby to permit passage of the lip axially beyond the blocking feature, and upon rotation of at least one of the packing sleeve removal tool or the packing sleeve, axially align the lip and the blocking feature such that an axial force applied to the packing sleeve removal tool is transmitted to the packing sleeve.

20. The pump assembly of claim 11, wherein:
at least a portion of the suction sleeve is positioned radially outward from the suction cover, and
the suction ring is positioned external to the suction bore and in axial contact with the suction sleeve to block axial movement of the suction sleeve, the fluid end further comprising a suction cover retainer coupled to the suction ring and positioned to block axial movement of the suction cover.

21. The pump assembly of claim 20, further comprising:
a suction sleeve removal tool configured to engage at least a portion of the suction sleeve; after the suction sleeve retainer is removed from the fluid end block, thereby to couple the suction sleeve removal tool to the suction sleeve when the suction sleeve removal tool is engaged with the at least a portion of the suction sleeve.

22. The pump assembly of claim 21, wherein:
the suction sleeve includes a cutout formed therein, and
the suction sleeve removal tool comprises:
- a body portion having an extension, the extension configured to engage the cutout; and
- one or more fasteners configured to apply an axial force to the body portion, thereby to drive the suction sleeve out of the second bore when the suction sleeve removal tool is engaged with the at least a portion of the suction sleeve.

23. A pump assembly; comprising:
the fluid end of claim 1, the fluid end block having a third bore, a fourth bore, and an internal chamber, the plunger bore extending from the first face to the internal chamber, the suction bore extending from the second face to the internal chamber, the third bore and the fourth bore extending independently toward the internal chamber, the internal chamber connected to each of the plunger bore, the suction bore, the third bore, and the fourth bore;
- a plunger arranged to reciprocate within the plunger bore; and
- a suction cover retainer coupled to the suction ring and positioned to block axial movement of the suction cover, the suction cover positioned within the suction bore, at least a portion of the suction sleeve positioned radially outward from the suction cover, and the suction ring positioned external to the suction bore and in axial contact with the suction sleeve, thereby to block axial movement of the suction sleeve.

24. The pump assembly of claim 23, wherein the suction sleeve has an end positioned substantially flush with the second face.

25. The pump assembly of claim 23, wherein the suction sleeve has an end extending axially farther than the second face.

26. The pump assembly of claim 25, wherein the suction ring includes a notch therein, and wherein the end of the suction sleeve extends, at least partially, into the notch.

27. The pump assembly of claim 23, further comprising:
a suction sleeve removal tool, the suction sleeve removal tool configured to engage at least a portion of the suction sleeve after the suction sleeve retainer is removed, thereby to couple the suction sleeve to the at least a portion of the suction sleeve when the suction sleeve removal tool is engaged with the at least a portion of the suction sleeve.

28. The pump assembly of claim 27, wherein:
the suction sleeve defines a cutout formed therein, and
the suction sleeve removal tool comprises:
- a body portion having an extension, the extension configured to engage the cutout, and
- one or more fasteners for applying an axial force to the body portion, thereby to drive the suction sleeve out of the suction bore when the suction sleeve removal tool is engaged with the at least a portion of the suction sleeve.

29. The pump assembly of claim 23, further comprising:
a valve assembly comprising a valve member; and
a valve sleeve arranged within one or more of the third bore or the fourth bore, the valve sleeve positioned to interact with the valve member.

* * * * *